United States Patent
Park et al.

(10) Patent No.: US 10,638,129 B2
(45) Date of Patent: Apr. 28, 2020

(54) METHOD FOR PROCESSING VIDEO SIGNAL AND DEVICE FOR SAME

(71) Applicant: LG Electronics Inc., Seoul (KR)

(72) Inventors: Naeri Park, Seoul (KR); Jaehyun Lim, Seoul (KR); Jungdong Seo, Seoul (KR); Junghak Nam, Seoul (KR)

(73) Assignee: LG Electronics Inc., Seoul (KR)

(*) Notice: Subject to any disclaimer, the term of this patent is extended or adjusted under 35 U.S.C. 154(b) by 0 days.

(21) Appl. No.: 15/570,160

(22) PCT Filed: Apr. 27, 2016

(86) PCT No.: PCT/KR2016/004388
§ 371 (c)(1),
(2) Date: Oct. 27, 2017

(87) PCT Pub. No.: WO2016/175550
PCT Pub. Date: Nov. 3, 2016

(65) Prior Publication Data
US 2018/0124398 A1    May 3, 2018

Related U.S. Application Data

(60) Provisional application No. 62/153,487, filed on Apr. 27, 2015.

(51) Int. Cl.
*H04N 19/109* (2014.01)
*H04N 19/119* (2014.01)
(Continued)

(52) U.S. Cl.
CPC ......... *H04N 19/109* (2014.11); *H04N 19/105* (2014.11); *H04N 19/107* (2014.11);
(Continued)

(58) Field of Classification Search
CPC ....... H04N 19/00696; H04N 19/01212; H04N 19/61; H04N 19/60; H04N 19/13;
(Continued)

(56) References Cited

U.S. PATENT DOCUMENTS

2013/0022117 A1* 1/2013 Lou .................. H04N 19/52
375/240.16
2013/0177083 A1* 7/2013 Chen .................. H04N 19/70
375/240.16
(Continued)

FOREIGN PATENT DOCUMENTS

JP       2011151774       8/2011
KR    10-2008-0088042    10/2008
(Continued)

OTHER PUBLICATIONS

International Search Report in International Application No. PCT/KR2016/004388, dated Aug. 8, 2016, 21 pages (with English translation).

*Primary Examiner* — Dramos Kalapodas
(74) *Attorney, Agent, or Firm* — Fish & Richardson P.C.

(57) ABSTRACT

The present invention relates to method and device for decoding a bitstream for a video signal in a decoding device, the method comprising the steps of: obtaining skip flag information about a current coding block from a bitstream; and, if the skip flag information indicates that a skip mode is applied with respect to the current coding block, performing inter-prediction for the current coding block by means of inter-prediction parameter information of a neighboring block of the current coding block. Moreover, the neighboring block of the current coding block comprises a plurality of temporal neighboring blocks and spatial neighboring blocks adjacent to the current coding block. Also, the step of performing inter-prediction for the current coding block comprises: dividing of the current coding block into a (Continued)

plurality of sub-blocks; with respect to each of the plurality of sub-blocks, obtaining of inter-prediction parameter information for the corresponding sub-blocks from neighboring blocks that are adjacent to the corresponding sub-blocks among the neighboring blocks of the current coding blocks; and obtaining of a predicted value for the corresponding sub-blocks on the basis of the obtained inter-prediction parameter information.

20 Claims, 12 Drawing Sheets

(51) Int. Cl.
*H04N 19/96* (2014.01)
*H04N 19/463* (2014.01)
*H04N 19/70* (2014.01)
*H04N 19/105* (2014.01)
*H04N 19/107* (2014.01)
*H04N 19/124* (2014.01)
*H04N 19/91* (2014.01)

(52) U.S. Cl.
CPC ......... *H04N 19/119* (2014.11); *H04N 19/124* (2014.11); *H04N 19/463* (2014.11); *H04N 19/70* (2014.11); *H04N 19/96* (2014.11); *H04N 19/91* (2014.11)

(58) Field of Classification Search
CPC ........ H04N 19/17; H04N 19/46; H04N 19/70; H04N 19/00733; H04N 19/189; H04N 19/169; H04N 19/90; H04N 19/105; H04N 19/52; H04N 19/517; H04N 19/51; H04N 19/513; H04N 19/503; H04N 19/50; H04N 19/597; H04N 19/00024; H04N 19/00278; H04N 19/00272; H04N 19/109

See application file for complete search history.

(56) References Cited

U.S. PATENT DOCUMENTS

| | | | | |
|---|---|---|---|---|
| 2014/0161186 A1* | 6/2014 | Zhang | ............... | H04N 19/597 |
| | | | | 375/240.16 |
| 2014/0307799 A1* | 10/2014 | Oh | ............... | H04N 19/159 |
| | | | | 375/240.16 |
| 2014/0376638 A1* | 12/2014 | Nakamura | ......... | H04N 19/463 |
| | | | | 375/240.16 |
| 2015/0373366 A1* | 12/2015 | He | ............... | H04N 19/521 |
| | | | | 375/240.16 |
| 2015/0381994 A1* | 12/2015 | Yu | ............... | H04N 19/186 |
| | | | | 375/240.24 |

FOREIGN PATENT DOCUMENTS

| | | |
|---|---|---|
| KR | 10-2013-0055314 | 5/2013 |
| KR | 10-2013-0119478 | 10/2013 |
| KR | 10-2014-0064944 | 5/2014 |

* cited by examiner

METHOD FOR PROCESSING VIDEO SIGNAL AND DEVICE FOR SAME

CROSS-REFERENCE TO RELATED APPLICATIONS

This application is a National Stage application under 35 U.S.C. § 371 of International Application No. PCT/KR2016/004388, filed Apr. 27, 2016, which claims the benefit of U.S. Provisional Application No. 62/153,487, filed on Apr. 27, 2015. The disclosures of the prior applications are incorporated by reference in their entirety.

TECHNICAL FIELD

The present invention relates to video processing, and more specifically, relates to a method and apparatus for processing a video signal using inter prediction.

BACKGROUND ART

In accordance with the rapid development of a digital video processing technology, a digital multimedia service using various media such as high-definition digital broadcasting, digital multimedia broadcasting, internet broadcasting and the like has been activated. As the high-definition digital broadcasting becomes common, various service applications have been developed and high-speed video processing techniques for video images of high quality and high definition are required. To this end, standards for coding video signals such as H.265/HEVC (High Efficiency Video Coding) and H.264/AVC (Advanced Video Coding) have been actively discussed.

DISCLOSURE OF THE INVENTION

Technical Tasks

One technical task of the present invention is to provide a method of processing a video signal efficiently and apparatus therefor.

Another technical task of the present invention is to improve prediction performance and coding efficiency of a coding block using multiple merge candidates in merge skip mode.

Further technical task of the present invention is to improve coding efficiency in merge skip mode by reducing syntax information required for the merge skip mode.

Technical tasks obtainable from the present invention are non-limited by the above-mentioned technical task. And, other unmentioned technical tasks can be clearly understood from the following description by those having ordinary skill in the technical field to which the present invention pertains.

Technical Solutions

In a first aspect of the present invention, provided herein is a method of decoding a bitstream for a video signal by a decoding device, the method comprising: obtaining skip flag information for a current coding block from the bitstream; and when the skip flag information indicates that a skip mode is applied to the current coding block, performing an inter prediction for the current coding block using inter prediction parameter information of neighbor blocks of the current coding block, wherein the neighbor blocks of the current coding block include a temporal neighbor block and a plurality of spatial neighbor blocks adjacent to the current coding block, and wherein performing the inter prediction for the current coding block includes: partitioning the current coding block into a plurality of subblocks, for each of the plurality of subblocks, obtaining inter prediction parameter information for a corresponding subblock from a neighbor block adjacent to the corresponding subblock among the neighbor blocks of the current coding block, and obtaining a prediction value for the corresponding subblock based on the obtained inter prediction parameter information.

In a second aspect of the present invention, provided herein is a decoding apparatus configured to decode a bitstream for a video signal, the decoding apparatus comprising a processor, wherein the processor configured to: obtain skip flag information for a current coding block from the bitstream, and when the skip flag information indicates that a skip mode is applied to the current coding block, perform an inter prediction for the current coding block using inter prediction parameter information of neighbor blocks of the current coding block, wherein the neighbor blocks of the current coding block include a temporal neighbor block and a plurality of spatial neighbor blocks adjacent to the current coding block, and wherein performing the inter prediction for the current coding block includes: partitioning the current coding block into a plurality of subblocks, for each of the plurality of subblocks, obtaining inter prediction parameter information for a corresponding block from a neighbor block adjacent to the corresponding subblock among the neighbor blocks of the current coding block, and obtaining a prediction value for the corresponding subblock based on the obtained inter prediction parameter information.

Preferably, when the current coding block is partitioned into 4 subblocks having a same size, inter prediction parameter information for a top left subblock of the 4 subblocks is obtained from a top left neighbor block adjacent to the current coding block, inter prediction parameter information for a top right subblock of the 4 subblocks is obtained from a top neighbor block adjacent to the current coding block, inter prediction parameter information for a bottom left subblock of the 4 subblocks is obtained from a left neighbor block adjacent to the current coding block, and inter prediction parameter information for a bottom right subblock of the 4 subblocks is obtained from the temporal neighbor block.

Preferably, when the current coding block is partitioned into 2 subblocks having a same size and each having a greater vertical size, inter prediction parameter information for a left subblock of the 2 subblocks is obtained from a left neighbor block adjacent to the current coding block, and inter prediction parameter information for a right subblock of the 2 subblocks is obtained from a top neighbor block adjacent to the current coding block.

Preferably, when the current coding block is partitioned into 2 subblocks having different sizes and each having a greater vertical size and a left subblock has a greater horizontal size than a right subblock, inter prediction parameter information for the left subblock of the 2 subblocks is obtained from a left neighbor block adjacent to the current coding block, and inter prediction parameter information for the right subblock of the 2 subblocks is obtained from a top right neighbor block adjacent to the current coding block.

Preferably, when the current coding block is partitioned into 2 subblocks having different sizes and each having a greater vertical size and a left subblock has a smaller horizontal size than a right subblock, inter prediction parameter information for the left subblock of the 2 subblocks is obtained from a bottom left neighbor block adjacent to the current coding block, and inter prediction parameter information for the right subblock of the 2 subblocks is obtained from a top neighbor block adjacent to the current coding block.

Preferably, obtaining the inter prediction parameter information for the corresponding subblock from the neighbor block adjacent to the corresponding subblock includes: assigning inter prediction parameter information of the neighbor block adjacent to the corresponding subblock to the inter prediction parameter information for the corresponding subblock.

Preferably, obtaining the inter prediction parameter information for the corresponding subblock from the neighbor block adjacent to the corresponding subblock includes: assigning a representative value of inter prediction parameter information of the neighbor block adjacent to the corresponding subblock to the inter prediction parameter information for the corresponding subblock.

Preferably, the representative value is one of an average value, a median value, a modal value, or a minimum value.

Preferably, obtaining the inter prediction parameter information for the corresponding subblock from the neighbor block adjacent to the corresponding subblock includes: when the neighbor block adjacent to the corresponding subblock is not available, assigning inter prediction parameter information of an available neighbor block among the neighbor blocks of the current block to the inter prediction parameter information for the corresponding subblock.

Preferably, the inter prediction parameter information of the available neighbor block is scaled in consideration of a POC (picture order count) distance ratio of reference pictures between the neighbor block adjacent to the corresponding subblock and the available neighbor block.

Preferably, the bitstream does not include information indicating a neighbor block from which the inter prediction parameter information for the corresponding subblock is to be obtained.

Preferably, the spatial neighbor block corresponds to a neighbor block located on an opposite side of the region with respect to the specific boundary in a picture including the current block, and the temporal neighbor block corresponds to a block having a position corresponding to the current coding block in a picture different from the picture including the current block.

Advantageous Effects

According to the present invention, a video signal can be efficiently processed.

And, according to the present invention, prediction performance and coding efficiency of a coding block can be improved using multiple merge candidates in merge skip mode.

Moreover, according to the present invention, coding efficiency in merge skip mode can be improved by reducing syntax information required for the merge skip mode.

Effects obtainable from the present invention are non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention, illustrate embodiments of the invention and together with the description serve to explain the principle of the invention.

BEST MODE FOR INVENTION

Figure 1:
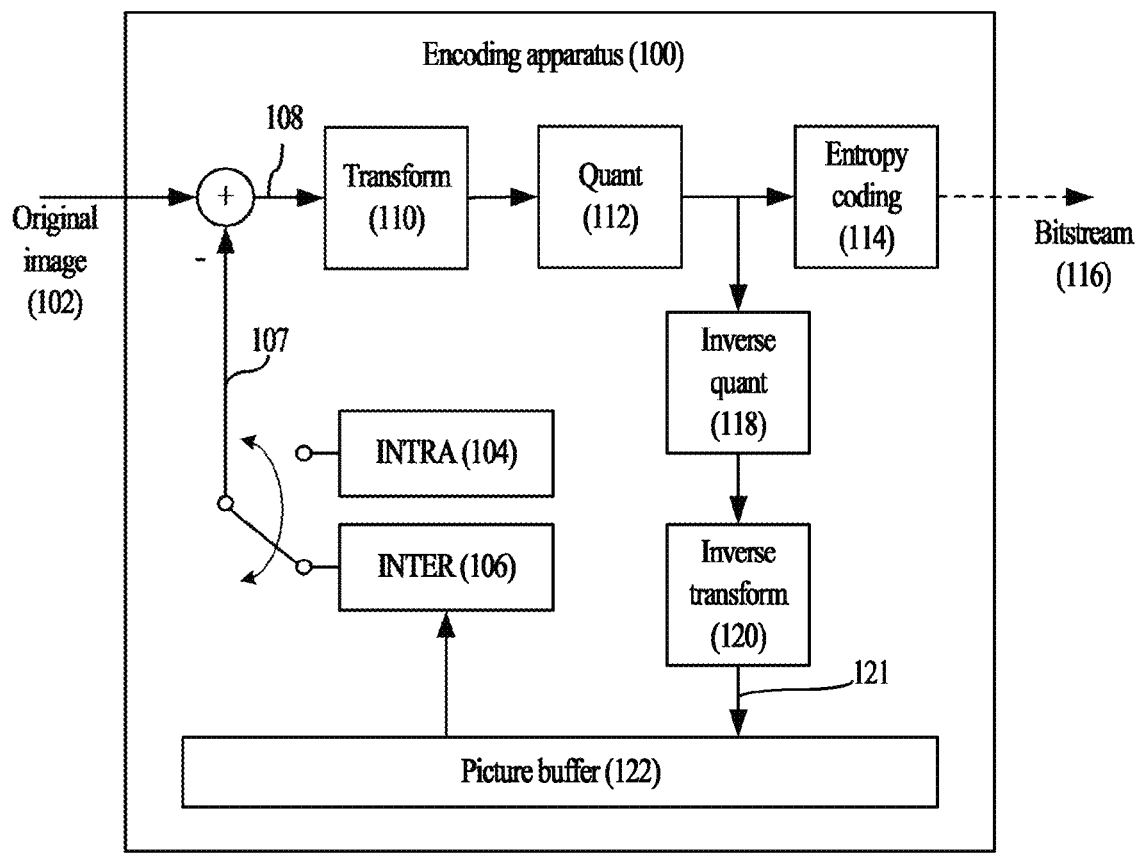
FIG. 1 illustrates an encoding procedure.

A technology described in the following can be used for an image signal processing apparatus configured to encode and/or decode a video signal. Generally, a video signal corresponds to an image signal or a sequence of pictures capable of being recognized by eyes. Yet, in the present specification, the video signal can be used for indicating a sequence of bits representing a coded picture or a bit stream corresponding to a bit sequence. A picture may indicate an array of samples and can be referred to as a frame, an image, or the like. More specifically, the picture may indicate a two-dimensional array of samples or a two-dimensional sample array. A sample may indicate a minimum unit for constructing a picture and may be referred to as a pixel, a picture element, a pel, or the like. The sample may include a luminance (luma) component and/or a chrominance (chroma, color difference) component. In the present specification, coding may be used to indicate encoding or may commonly indicate encoding/decoding.

A picture may include at least one or more slices and a slice may include at least one or more blocks. The slice can be configured to include the integer number of blocks for purposes such as parallel processing, resynchronization of decoding when a bit stream is damaged due to data loss, and the like. Each slice can be independently coded. A block may include at least one or more samples and may indicate an array of samples. A block may have a size equal to or a less than a size of a picture. A block may be referred to as a unit. A currently coded picture may be referred to as a current picture and a block currently being coded may be referred to as a current block. There may exist various block units constructing a picture. For example, in case of ITU-T H.265 standard (or High Efficiency Video Coding (HEVC) standard), there may exist such a block unit as a coding tree block (CTB) (or a coding tree unit (CTU)), a coding block (CB) (or a coding unit (CU)), a prediction block (PB) (or a prediction unit (PU)), a transform block (TB) (or a transform unit (TU)), and the like.

The coding tree block corresponds to the most basic unit for constructing a picture and can be divided into coding blocks of a quad-tree form to improve coding efficiency according to texture of a picture. The coding block may correspond to a basic unit for performing coding and intra-coding or inter-coding can be performed in a unit of the coding block. The intra-coding is to perform coding using intra prediction and the intra prediction is to perform prediction using samples included in the same picture or slice. The inter-coding is to perform coding using inter prediction and the inter prediction is to perform prediction using samples included in a picture different from a current picture. A block coded using the intra-coding or coded in an intra prediction mode may be referred to as an intra block, and a block coded using the inter-coding or coded in an inter prediction mode may be referred to as an inter block. And, a coding mode using intra prediction can be referred to as an intra mode, and a coding mode using inter prediction can be referred to as an inter mode.

The prediction block may correspond to a basic unit for performing prediction. Identical prediction can be applied to a prediction block. For example, in case of the inter prediction, the same motion vector can be applied to one prediction block. The transform block may correspond to a basic unit for performing transformation. The transformation may correspond to an operation of transforming samples of a pixel domain (or a spatial domain or a time domain) into a conversion coefficient of a frequency domain (or a transform coefficient domain), or vice versa. In particular, an operation of converting a conversion coefficient of the frequency domain (or transform coefficient domain) into samples of the pixel domain (or spatial domain or time domain) can be referred to as inverse transformation. For example, the transformation may include discrete cosine transform (DCT), discrete sine transform (DST), a Fourier transform, and the like.

In the present specification, a coding tree block (CTB) may be interchangeably used with a coding tree unit (CTU), a coding block (CB) may be interchangeably used with a coding unit (CU), a prediction block (PB) may be interchangeably used with a prediction unit (PU), and a transform block (TB) may be interchangeably used with a transform unit (TU).

FIG. 1 illustrates an encoding procedure.

An encoding apparatus 100 receives an input of an original image 102, performs encoding on the original image, and outputs a bit stream 114. The original image 102 may correspond to a picture. Yet, in the present example, assume that the original image 102 corresponds to a block for constructing a picture. For example, the original image 102 may correspond to a coding block. The encoding apparatus 100 can determine whether the original image 102 is coded in intra mode or inter mode. If the original image 102 is included in an intra picture or a slice, the original image 102 can be coded in the intra mode only. However, if the original image 102 is included in an inter picture or a slice, for example, it is able to determine an efficient coding method in consideration of RD (rate-distortion) cost after the intra-coding and the inter-coding are performed on the original image 102.

In case of performing the intra-coding on the original image 102, the encoding apparatus 100 can determine an intra-prediction mode showing RD optimization using reconstructed samples of a current picture including the original image 102 (104). For example, the intra-prediction mode can be determined by one selected from the group consisting of a direct current (DC) prediction mode, a planar prediction mode and an angular prediction mode. The DC prediction mode corresponds to a mode in which prediction is performed using an average value of reference samples among reconstructed samples of a current picture, the planar prediction mode corresponds to a mode in which prediction is performed using bilinear interpolation of reference samples, and the angle prediction mode corresponds to a mode in which prediction is performed using a reference sample located in a specific direction with respect to the original image 102. The encoding apparatus 100 can output a predicted sample or a prediction value (or predictor) 107 using the determined intra prediction mode.

When the inter-coding is performed on the original image 102, the encoding apparatus 100 performs motion estimation (ME) using a reconstructed picture included in a (decoded) picture buffer 122 and may be then able to obtain motion information (106). For example, the motion information can include a motion vector, a reference picture index, and the like. The motion vector may correspond to a two-dimensional vector that provides an offset from a coordinate of the original image 102 to a coordinate in a reference picture in a current picture. The reference picture index may correspond to an index for a list of reference pictures (or a reference picture list) used for inter prediction among the reconstructed pictures stored in the (decoded) picture buffer 122. The reference picture index indicates a corresponding reference picture. The encoding apparatus 100 can output a predicted sample or a predicted value 107 using the obtained motion information.

Subsequently, the encoding apparatus 100 can generate a residual data 108 from a difference between the original image 102 and the predicted sample 107. The encoding apparatus 100 can perform a transformation on the generated residual data 108 (110). For example, Discrete Cosine Transform (DCT), Discrete Sine Transform (DST), and/or wavelet transform can be applied for the transformation. More specifically, it may use an integer-based DCT having a size of 4×4 to 32×32 and 4×4, 8×8, 16×16, and 32×32 transforms can be used. The encoding apparatus 100 performs transformation 110 to obtain transform coefficient information.

The encoding apparatus 100 quantizes the transform coefficient information to generate quantized transform coefficient information (112). Quantization may correspond to an operation of scaling a level of the transform coefficient information using a quantization parameter (QP). Hence, the quantized transform coefficient information may be referred to as scaled transform coefficient information. The quantized transform coefficient information can be output as a bit stream 116 via entropy coding 114. For example, the entropy coding 114 can be performed based on fixed length coding (FLC), variable length coding (VLC), or arithmetic coding. More specifically, it may apply context adaptive binary arithmetic coding (CABAC) based on arithmetic coding, Exp-Golomb coding based on variable length coding, and fixed length coding.

And, the encoding apparatus 100 performs inverse quantization 118 and inverse transformation 120 on the quantized transform coefficient information to generate a reconstructed sample 121. Although it is not depicted in FIG. 1, in-loop filtering can be performed on a reconstructed picture after obtaining the reconstructed picture by acquiring the reconstructed sample 121 for a picture. For the in-loop filtering, for example, it may apply a deblocking filter, a sample adaptive offset (SAO) filter. Subsequently, the reconstructed picture 121 is stored in the picture buffer 122 and can be used for encoding a next picture.

Figure 2:
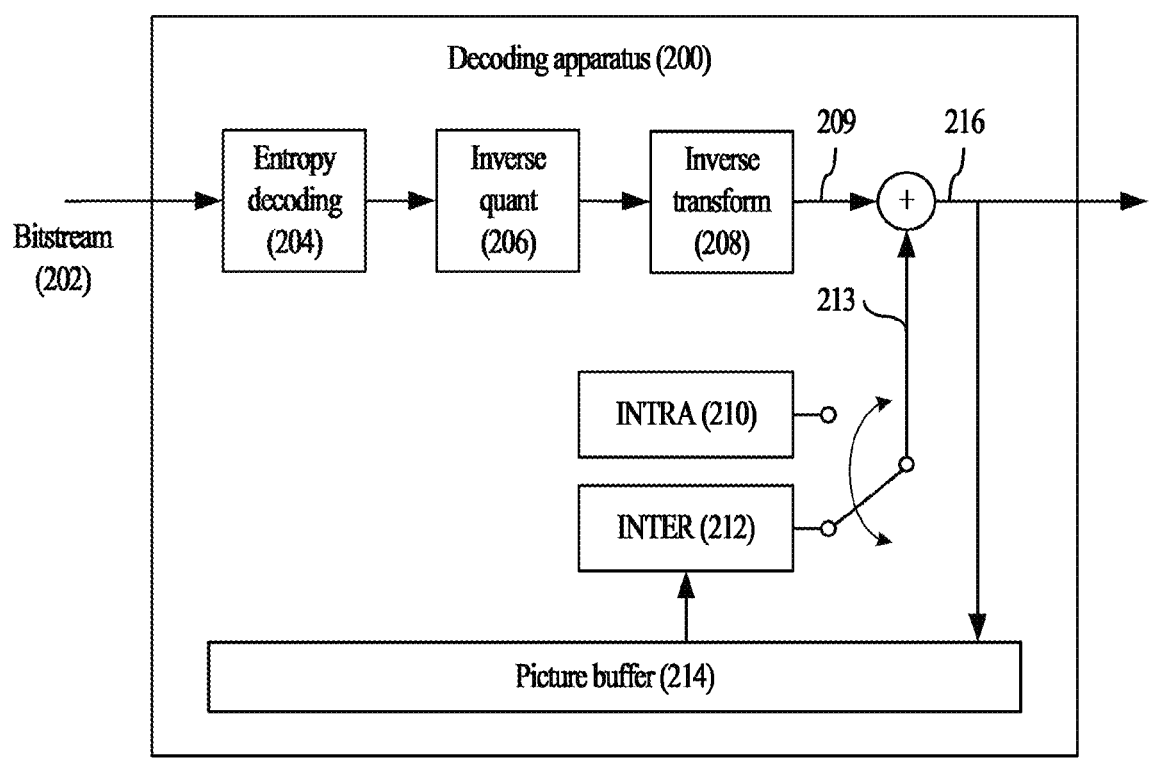
FIG. 2 illustrates a decoding procedure.

FIG. 2 illustrates a decoding procedure.

A decoding apparatus 200 receives a bit stream 202 and can perform entropy decoding 204. The entropy decoding 204 may correspond to a reverse operation of the entropy coding 114 mentioned earlier in FIG. 1. The decoding apparatus 200 can obtain data and (quantized) transform coefficient information necessary for decoding by including prediction mode information, intra prediction mode information, motion information, and the like through the entropy decoding 204. The decoding apparatus 200 can generate a residual data 209 by performing inverse quantization 206 and inverse transformation 208 on the obtained transform coefficient information.

The prediction mode information obtained through the entropy decoding 204 can indicate whether a current block is coded in intra mode or inter mode. If the prediction mode information indicates the intra mode, the decoding apparatus 200 can obtain a prediction sample (or prediction value) 213 from reconstructed samples of a current picture based on the intra prediction mode obtained through the entropy decoding 204 (210). If the prediction mode information indicates the inter mode, the decoding apparatus 200 can obtain a prediction sample (or prediction value) 213 from a reference picture stored in the picture buffer 214 based on the motion information obtained through the entropy decoding 204 (212).

The decoding apparatus 200 can obtain a reconstructed sample 216 for the current block using the residual data 209 and the prediction sample (or prediction value). Although it is not depicted in FIG. 2, in-loop filtering can be performed on a reconstructed picture after the picture is reconstructed by obtaining the reconstructed sample 216 for a picture. Subsequently, the reconstructed picture 216 can be stored in the picture buffer to decode a next picture or can be outputted for display.

A video encoding/decoding process requires very high complexity for software/hardware (SW/HW) processing. Hence, in order to perform a job of high complexity using a limited resource, it is able to process a picture (or video) in a manner of partitioning it by a basic processing unit that is a minimum processing unit. Thus, one slice may include at least one basic processing unit. In this case, a basic processing unit included in one picture or slice may have a same size.

In case of HEVC (High Efficiency Video Coding) standard (ISO/IEC 23008-2 or ITU-T H.265), as described above, a basic processing unit may be referred to as CTB (Coding Tree Block) or CTU (Coding Tree Unit) and have a size of 64×64 pixels. Hence, in case of the HEVC standard, a single picture can be encoded/decoded in a manner of being divided by CTU that is a basic processing unit. For detailed example, in case of encoding/decoding 8192×4096 picture, it is able to perform an encoding procedure shown in FIG. 1 or a decoding procedure shown in FIG. 2 on 8,192 CTUs resulting from dividing a picture into the 8,192 CTUs (=128×64).

A video signal or bitstream may include a sequence parameter set (SPS), a picture parameter set (PPS), at least one access unit. The sequence parameter set includes parameter information (of pictures) in a sequence level, and the parameter information of the sequence parameter set may be applied to pictures included in a sequence of pictures. The picture parameter set includes parameter information in a picture level, and information of the picture parameter set may be applied to each slice included in a picture. The access unit refers to a unit corresponding to one picture, and may include at least one slice. A slice may include an integer number of CTUs. Syntax information refers to data included in a bitstream, and a syntax structure refers to a structure of syntax information which is present in a bistream in a specific order.

A size of a coding tree block may be determined using parameter information of SPS. The SPS may include first information indicating the minimum size of a coding block and second information indicating a difference between the minimum size of the coding block and the maximum size of the coding block. In the present specification, the first information may be referred to as log 2_min_luma_coding_block_size_minus3, and the second information may be referred to as log 2_diff_max_min_luma_coding_block_size. Generally, the size of a block may be represented by a power of 2, and thus each information may be represented as a log 2 value of an actual value. Thus, a log 2 value of the minimum size of the coding block may be obtained by adding a specific offset (e.g. 3) to a value of the first information, and a log 2 value of the size of a coding tree block may be obtained by adding a value of the second information to a log 2 value of the minimum size of the coding block. The size of the coding tree block may be obtained by left shifting 1 by the log 2 value. The second information indicating a difference between the minimum size and the maximum size may represent a maximum number of times for partitioning for coding blocks within a coding tree block. Or, the second information may represent a maximum depth of a coding tree within a coding tree block.

Specifically, assuming that a value of the first information (e.g. log 2_min_luma_coding_block_size_minus3) among parameter information of SPS is n, and a value of the second information (e.g. log 2_diff_max_min_luma_coding_block_size) is m, the minimum size N×N of the coding block may be determined to be N=1<<(n+3), and the size M×M of the coding tree block may be determined to be M=1<<(n+m+3) or N<<m. Further, the maximum number of allowed partitioning times for the coding block or the maximum depth of the coding tree within the coding tree block may be determined to be m.

For example, assuming that the size of the coding tree block is 64×64 and the maximum depth of the coding tree within the coding tree block is 3, the coding tree block may be partitioned up to 3 times using a coding tree scheme, and the minimum size of the coding block may be 8×8. Thus, the first information (e.g. log 2_min_luma_coding_block_size_minus3) among parameter information of SPS may have a value of 0, and the second information (e.g. log 2_diff_max_min_luma_coding_block_size) may have a value 3.

Figure 3:
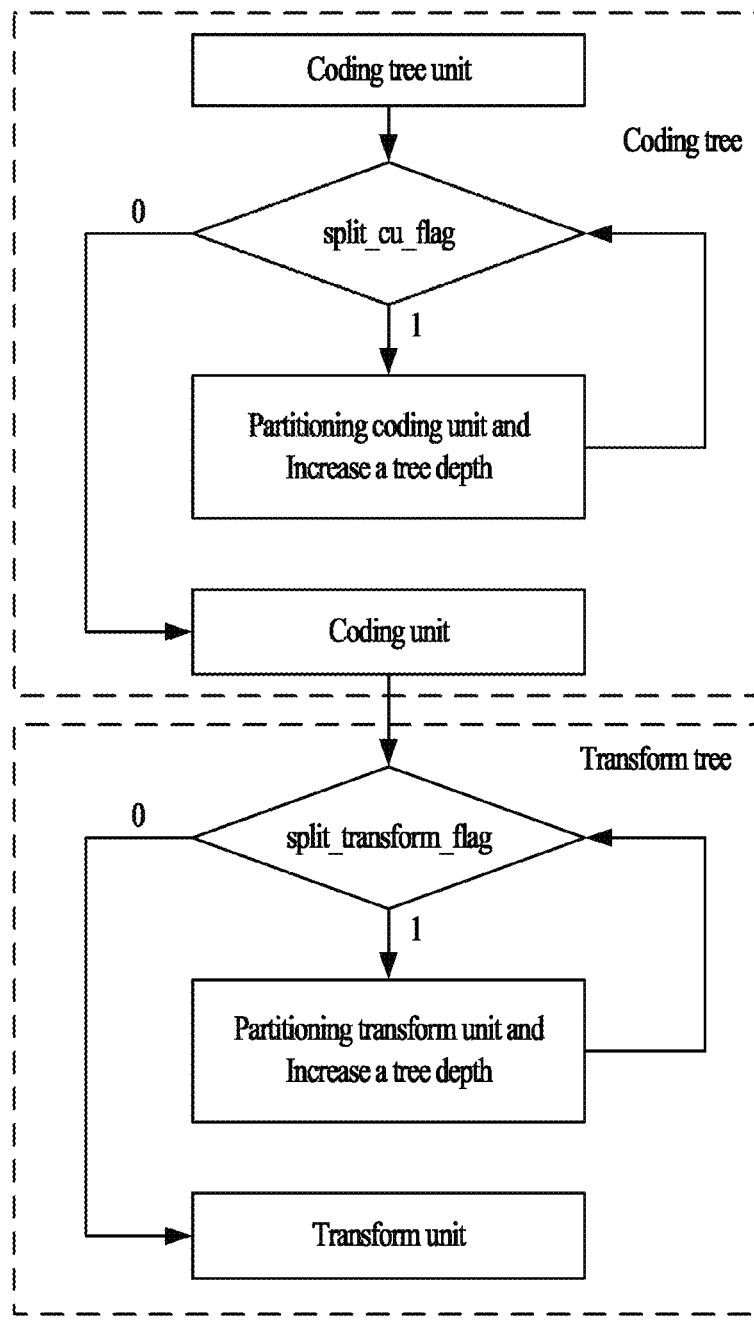
FIG. 3 illustrates a flow chart for a method of partitioning a coding tree block (CTB).

FIG. 3 illustrates a flow chart for a method of partitioning a coding tree block (CTB).

In the HEVC standard, unlike the existing video coding standards (e.g., VC-1, AVC), for the compression efficiency enhancement, after partitioning CTB into at least one coding block (CB) by a quadtree scheme, an intra or inter prediction mode can be determined for a coding block. If CTB is not partitioned, the CTB may correspond to a CB. In this case, the CB may have the same size of the CTB, and an intra or inter prediction mode can be determined for the corresponding CTB.

When a CTB is partitioned by a quadtree scheme, it may be partitioned recursively. After a CTB has been partitioned into 4 blocks, each of the blocks may be partitioned again into subblocks by a quadtree scheme in addition. Each block finally generated by recursively partitioning a CTB by a quadtree scheme may become a coding block. For example, after a CTB has been partitioned into first to fourth blocks, if the first block is partitioned into fifth to eighth blocks but the second to fourth blocks are not partitioned, the second to eighth blocks can be determined as coding blocks. In this example, an intra or inter prediction mode may be determined for each of the second to eighth blocks.

Whether a CTB is partitioned into a coding block may be determined by an encoder side in consideration of RD (rate distortion) efficiency, and information indicating a presence or non-presence of partition may be included in a bitstream. For example, information indicating whether a CTB or a coding block is partitioned into a coding block having a half horizontal/vertical size may be referred to as split_cu_flag in HEVC standard. Information indicating whether a block is partitioned within a CTB may be called a partition indication information for a coding block. A decoder side determines whether to partition a coding block by obtaining information indicating a presence or non-presence of partition for each coding block within a coding quadtree from a bitstream and is able to partition the coding block recursively by a quadtree scheme. A coding tree or coding quad tree refers to a tree structure of coding blocks formed by recursively partitioning a CTB. If each coding block is not partitioned anymore within a coding tree, the corresponding block may be finally referred to as a coding block.

As described above, a coding block can be partitioned into at least one prediction block to perform a prediction. Moreover, a coding block can be partitioned into at least one transform block to perform a transformation. In a manner similar to that of a CTB, a coding block may be recursively partitioned into a transform block by a quadtree scheme. A structure formed by partitioning a coding block by a quadtree scheme may be called a transform tree or a transform quad tree, and information indicating whether each block is partitioned within a transform tree may be included in a bitstream, which is similar to the partition indication information. For example, information indicating whether a block is partitioned into a unit having a half horizontal/vertical size for a transformation in HEVC standard may be called split_transform_flag. Information indicating whether each block is partitioned in a transform tree may be called partition indication information for a transform block.

Figure 4:
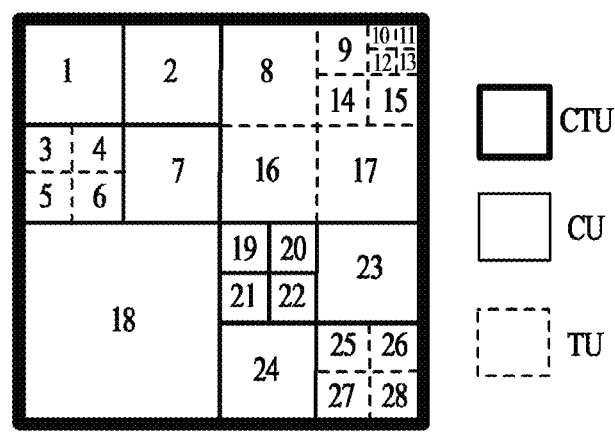
FIG. 4 illustrates an example of partitioning a CTB by a quadtree scheme.
Figure 4:
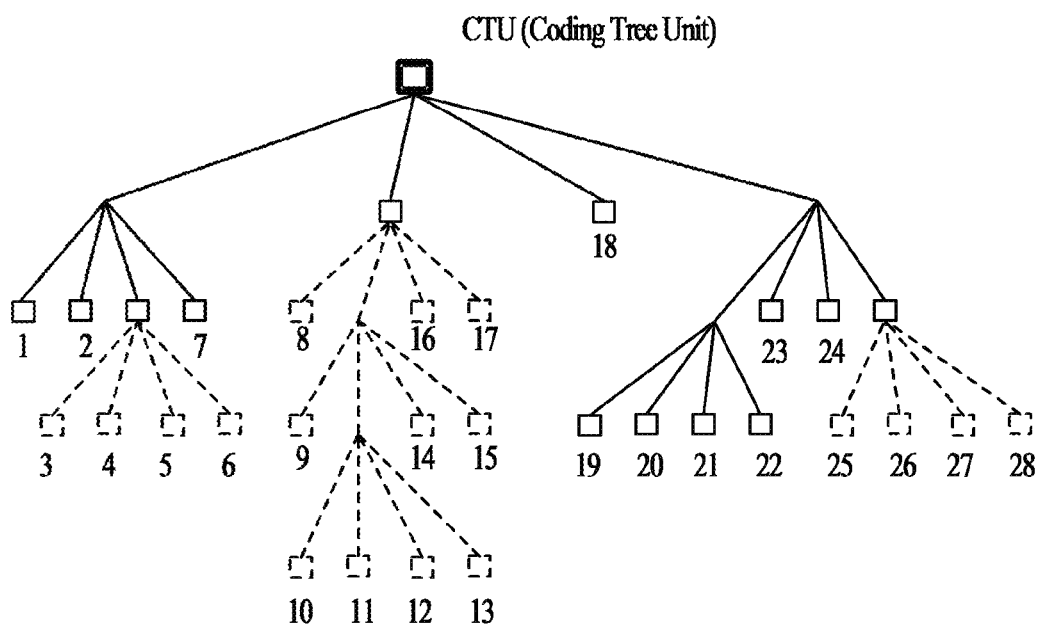

FIG. 4 illustrates an example of partitioning a CTB by a quadtree scheme.

Referring to FIG. 4, a CTB may be partitioned into a first coding block containing blocks 1 to 7, a second coding block containing blocks 8 to 17, a third coding block corresponding to a block 18, and a fourth coding block containing blocks 19 to 28. The first coding block may be partitioned into a coding block corresponding to the block 1, a coding block corresponding to the block 2, a fifth coding block containing the blocks 3 to 6, and a coding block corresponding to the block 7. The second coding block may be partitioned into additional transform blocks for transformation despite failing to be further partitioned within a coding quadtree. The fourth coding block may be partitioned into a sixth coding block containing the blocks 19 to 22, a coding block corresponding to the block 23, a coding block corresponding to the block 24, and a seventh coding block containing the blocks 25 to 28. The sixth coding block may be partitioned into a coding block corresponding to the block 19, a coding block corresponding to the block 20, a coding block corresponding to the block 21, and a coding block corresponding to the block 22. And, the seventh coding block may be partitioned into additional transform blocks for transformation despite failing to be further partitioned within a coding quadtree.

As described above, information (e.g., split_cu_flag) indicating a presence or non-presence of partition for a CTB or each coding block may be included in a bitstream. If the information indicating a presence or non-presence of partition has a first value (e.g., 1), the CTB or each coding block can be partitioned. If the information indicating a presence or non-presence of partition has a second value (e.g., 0), the CTB or each coding block is not partitioned. And, a value of the information indicating a presence or non-presence of partition may vary.

In the example shown in FIG. 4, the partition indication information (e.g., split_cu_flag) for the CTB, the first coding block, the fourth coding block and the sixth coding block may have the first value (e.g., 1). A decoder obtains partition indication information on the corresponding block from the bitstream and is then able to partition the corresponding unit into 4 subunits. On the other hand, the partition indication information (e.g., split_cu_flag) for other coding blocks (coding blocks corresponding to block 1, block 2, block 7, blocks 18 to 23, and blocks 3 to 6, coding blocks corresponding to blocks 8 to 17, and coding blocks corresponding to blocks 25 to 28) may have the second value (e.g., 0). The decoder obtains the partition indication information on the corresponding unit from the bitstream and does not further partition the corresponding unit according to this value.

As described above, each coding block may be partitioned into at least one transform block by a quadtree scheme according to partition indication information for a transform block for transformation. Referring now to FIG. 4, since a coding block corresponding to the blocks 1, 2, 7 and 18 to 24 is not partitioned for transformation, a transform block may correspond to a coding block but another coding block (a coding block corresponding to the blocks 3 and 4, 8 to 17, or 25 to 28) may be additionally partitioned for transformation. Partition indication information (e.g., split_transform_flag) for each unit within a transform tree formed from each coding block (e.g., a coding block corresponding to the blocks 3, 4, 8 to 17, or 25 to 28) and the corresponding coding block can be partitioned into a transform block according to a value of the partition indication information. As shown in FIG. 4 exemplarily, a coding block corresponding to the blocks 3 to 6 may be partitioned into transform blocks to form a transform tree of depth 1, a coding block corresponding to the blocks 8 to 17 may be partitioned into transform blocks to form a transform tree having depth 3, and a coding block corresponding to the blocks 25 to 28 may be partitioned into transform blocks to form a transform tree having depth 1.

Figure 5:
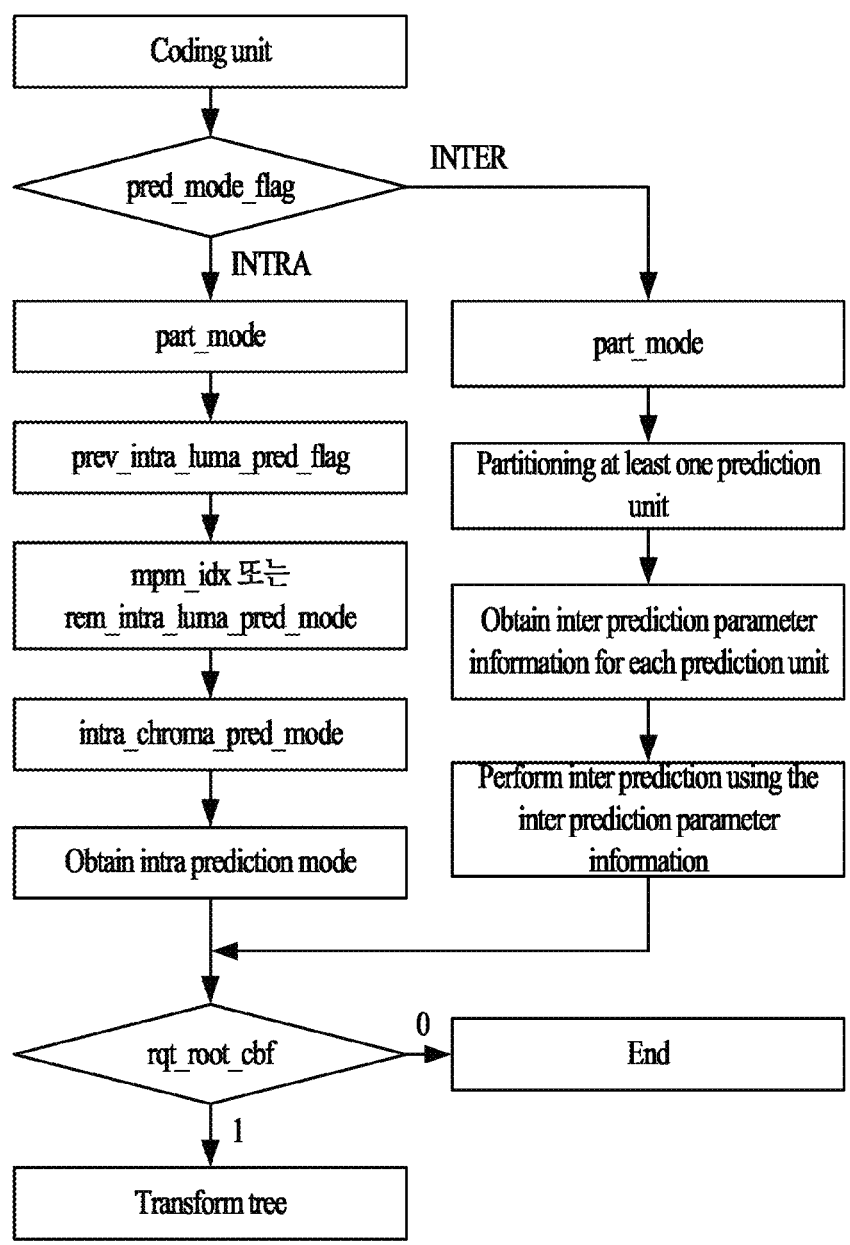
FIG. 5 illustrates an example of syntax information and operations for a coding block.
Figure 6:
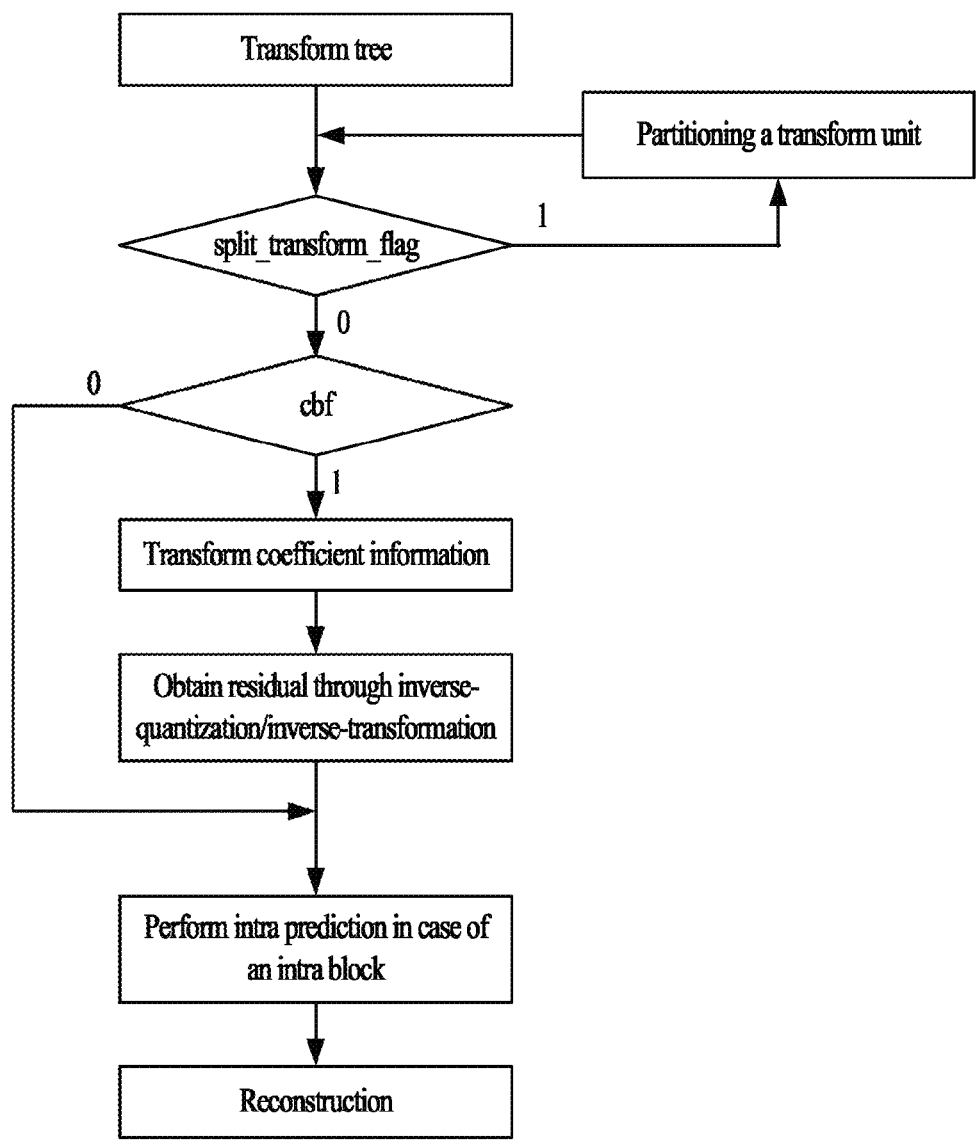
FIG. 6 illustrates an example of syntax information and operations for a transform tree.

FIG. 5 shows one example of syntax information and operations for a coding block, and FIG. 6 shows one example of syntax information and operations for a transform tree. As exemplarily shown in FIG. 5, information indicating whether a transform tree structure of a current coding block exists can be signaled through a bitstream. In the present specification, such information may be called transform tree coding indication information or rgt_root_cbf. A decoder obtains the transform tree coding indication information from the bitstream. If the transform tree coding indication information indicates that a transform tree for a corresponding coding block exists, the decoder can perform the operation shown in FIG. 6. If the transform tree coding indication information indicates that the transform tree for the corresponding coding block does not exist, transform coefficient information for the corresponding coding block does not exist and the coding block can be reconstructed using a prediction value (intra or inter prediction value) for the corresponding coding block.

A coding block is a basic unit for determining whether it is coded in intra or inter prediction mode. Hence, prediction mode information for each coding block can be signaled through a bitstream. The prediction mode information may indicate whether the corresponding coding block is coded using an intra prediction mode or an inter prediction mode.

If the prediction mode information indicates that the corresponding coding block is coded in the intra prediction mode, informations used in determining the intra prediction mode can be signaled through the bitstream. For example, the information used in determining the intra prediction mode may include intra prediction mode reference information. The intra prediction mode reference information indicates whether an intra prediction mode of a current coding block is derived from a neighbor (prediction) unit, and may be referred to as prev_intra_luma_pred_flag for example.

If the intra prediction mode reference information indicates whether the intra prediction mode of the current coding block is derived from the neighbor (prediction) unit, an intra prediction mode candidate list is constructed using an intra prediction mode of the neighbor unit and index information indicating an intra prediction mode of the current unit in the configured candidate list can be signaled through the bitstream. For example, index information indicating a candidate intra prediction ode used as the intra prediction mode of the current unit in the intra prediction mode candidate list may be referred to as mpm_idx. The decoder obtains the intra prediction mode reference information from the bitstream and may obtain the index information from the bitstream based on the obtained intra prediction mode reference information. Moreover, the decoder may set the intra prediction mode candidate indicated by the obtained index information as the intra prediction mode of the current unit.

If the intra prediction mode reference information does not indicate that the intra prediction mode of the current coding block is not derived from the neighbor unit, information indicating the intra prediction mode of the current unit can be signaled through the bitstream. The information signaled through the bitstream may be referred to as rem_intra_luma_pred_mode for example. The information obtained from the bitstream is compared with values of candidates in the intra prediction mode candidate list. If the obtained information is equal to or greater than the values, the intra prediction mode of the current unit can be obtained by an operation of increment by a specific value (e.g., 1).

If a picture contains a chroma component (or color difference component), information indicating an intra prediction mode for a chroma coding block may be signaled through a bitstream. For example, information indicating a chroma intra prediction mode can be referred to as intra_chroma_pred_mode. The chroma intra prediction mode can be obtained based on Table 1 using the information indicating the chroma intra prediction mode and the intra prediction mode obtained as described above (or the luma intra prediction mod). In Table 1, IntraPredModeY indicates the luma intra prediction mode.

TABLE 1

| | | IntraPredModeY | | | |
|---|---|---|---|---|---|
| intra_chroma_pred_mode | 0 | 26 | 10 | 1 | X (0 <= X <= 34) |
| 0 | 34 | 0 | 0 | 0 | 0 |
| 1 | 26 | 34 | 26 | 26 | 26 |
| 2 | 10 | 10 | 34 | 10 | 10 |
| 3 | 1 | 1 | 1 | 34 | 1 |
| 4 | 0 | 26 | 10 | 1 | X |

An intra prediction mode indicates various prediction odes according to values. A value of an intra prediction mode may correspond to an intra prediction mode, as shown in Table 2, through the aforementioned process.

TABLE 2

| Intra prediction mode | Associated name |
|---|---|
| 0 | INTRA_PLANAR |
| 1 | INTRA_DC |
| 2 . . . 34 | INTRA_ANGULAR2 . . . INTRA_ANGULAR34 |

In Table 2, INTRA_PLANAR indicates a planar prediction mode and also indicates a mode for obtaining a prediction value of a current block by performing an interpolation on a reconstructed sample of an upper neighbor block adjacent to a current block, a reconstructed sample of a left neighbor block, a reconstructed sample of a lower-left neighbor block, and a reconstructed sample of a right-upper neighbor block. INTRA_DC indicates a DC (Direct Current) prediction mode, and also indicates a mode for obtaining a prediction value of a current block using averages of the reconstructed samples of left neighbor block and the reconstructed samples of upper neighbor block. INTRA_ANGULAR2 to INTRA_ANGULAR34 indicate angular prediction mode, and also indicate a mode for finding a prediction value of a current sample using a reconstructed sample of a neighbor block located in a direction of a specific angle for a current sample within a current block. If a real sample fails to exist in the direction of the specific angle, it is able to find a prediction value in a manner of generating a virtual sample for the corresponding direction by performing an interpolation on neighbor reconstructed samples.

An intra prediction mode may be found per coding block. Yet, intra prediction may be performed by a unit of a transform block. Hence, the aforementioned reconstructed sample of the neighbor block may refer to a reconstructed sample existing within a neighbor block of a current transform block. After finding a prediction value for a current block using an intra prediction mode, it is able to find a difference between the sample value of the current block and the prediction value. The difference between the sample value of the current block and the prediction value may be referred to as a residual (or residual information or residual data). A decoder side obtains transform coefficient information on the current block from a bitstream and is then able to find a residual by performing dequantization and inverse transform on the obtained transform coefficient information. Dequantization may refer to scaling a value of transform coefficient information using a quantization parameter (QP). Since a transform block is a basic unit for performing a transform, transform coefficient information can be signaled through a bitstream by a unit of the transform block.

In case of performing an intra prediction, a residual may be 0. For example, if a sample of a current block is identical to a reference sample for intra prediction, a value of a residual may be 0. If a residual value for a current block is 0 all, since a value of transform coefficient information is 0 all, it is not necessary to signal the transform coefficient information through a bitstream. Hence, information indicating whether transform coefficient information for a corresponding block is signaled through a bitstream can be signaled through a bitstream. Information indicating whether a corresponding transform block has transform coefficient information that is not 0 refers to coded block indication information or coded block flag information, and may be referred to as cbf in the present specification. Coded block indication information for a luma component may be referred to as cbf_luma and coded block indication information for a chroma component may be referred to as cbf_cr or cbf_cb. The decoder obtains coded block indication information for a corresponding transform block from a bitstream. If the coded block indication information indicates that the corresponding block contains transform coefficient information that is not 0, the decoder obtains the transform coefficient information for the corresponding transform block from the bitstream and is also able to obtain a residual through dequantization and inverse transform.

If a current coding block is coded in intra prediction mode, the decoder finds a prediction value for the current coding block by finding a prediction value by transform block unit and/or may find a residual for the current coding block by finding a residual by transform block unit. The decoder can reconstruct the current coding block using the prediction value and/or residual for the current coding block.

As a transform/inverse transform scheme, a discrete cosine transform (DCT) is used popularly. Transform bases for DCT may be approximated in integer form for small memory and fast operation. Transform bases approximated into integers can be represented as a matrix form. And, the transform bases represented in matrix form may be referred to as a transform matrix. In the H.265/HEVC standard, integer transforms in 4×4 to 32×32 sizes are used and a 4×4 or 32×32 transform matrix is provided. The 4×4 transform matrix may be used for 4×4 transform/inverse transform, and the 32×32 transform matrix may be used for 8×8, 16×16, or 32×32 transform/inverse transform.

Meanwhile, if prediction mode information for a current coding block indicates that a current coding block is coded using inter prediction, information indicating a partitioning mode of the current coded coding can be signaled through a bitstream. The information indicating the partitioning mode of the current coding block may be represented as part_mode for example. If the current coding block is coded using inter prediction, the current coding block can be partitioned into at least one prediction block according to the partitioning mode of the current coding block.

For example, assuming that a current coding block is 2N×2N block, partitioning modes may include PART_2N×2N, PART_2N×N, PART_N×2N, PART_2N×nU, PART_2N×nD, PART_nL×2N, PART_nR×2N, and PART_N×N. PART_2N×2N indicates a mode that a current coding block is equal to a prediction block. PART_2N×N indicates a mode that a current coding block is partitioned into 2 2N×N prediction blocks. PART_N×2N indicates that a current coding block is partitioned into 2 N×2N prediction blocks. PART_2N×nU indicates a mode that a current coding block is partitioned into an upper 2N×n prediction block and a lower 2N×(N−n) prediction block. PART_2N×nD indicates a mode that a current coding block is partitioned into an upper 2N×(N−n) prediction block and a lower 2N×n prediction block. PART_nL×2N indicates a mode that a current coding block is partitioned into a left n×2N prediction block and a right (N−n)×2N prediction block. PART_nR×2N indicates a mode that a current coding block is partitioned into a left (N−n)×2N prediction block and a right n×2N prediction block. PART_N×N indicates a mode that a current coding block is partitioned into 4 N×N prediction blocks. For example, n is N/2.

Even if a current coding block is in intra coding mode, part_mode can be signaled through a bitstream. Yet, when a current coding block is in intra coding mode, only if a size of the current coding block is a minimum size of a coding block, part_mode is signaled. And, it is able to indicate whether the current coding block is additionally partitioned into 4 blocks.

A prediction unit is a unit for performing motion estimation and motion compensation. Hence, inter prediction parameter information can be signaled through a bitstream by a unit of a prediction unit. The inter prediction parameter information may include reference picture information, motion vector information and the like for example. The inter prediction parameter information may be derived from a neighbor unit or signaled through a bitstream. A case of deriving the inter prediction parameter information from the neighbor unit is referred to as a merge mode. Hence, information indicating whether inter prediction parameter information for a current prediction unit is derived from a neighbor unit can be signaled through a bitstream. And, the corresponding information may refer to merge indication information or merge flag information. The merge indication information may be represented as merge_flag.

If a merge indication mode indicates that inter prediction parameter information of a current prediction unit is derived from a neighbor unit, a merge candidate list is constructed using the neighbor unit, information indicating a merge candidate to derive the inter prediction parameter information of the current unit in the merge candidate list can be signaled through a bitstream, and the corresponding information may be referred to as merge index information. For example, the merge index information may be represented as merge_idx. Neighbor blocks may include spatial neighbor blocks including a left neighbor block adjacent to a current block, an upper neighbor block, an upper-left neighbor block, a lower-left neighbor block, and an upper-right neighbor block in a picture including the current block and a temporal neighbor block located (or co-located) at a position corresponding to the current block in a picture different from the picture including the current block. The decoder may construct a merge candidate list using the neighbor blocks, obtain merge index information from the bitstream, and set inter prediction parameter information of a neighbor block indicated by the merge index information in the merge candidate list as inter prediction parameter information of the current block.

Meanwhile, when a prediction block corresponds to a coding block, as a result of performing inter prediction on the prediction block, if inter prediction information is identical to a specific neighbor block and residual is 0 all, it is not necessary to signal the inter prediction parameter information, transform coefficient information and the like through a bitstream. In this case, since the inter prediction parameter information for a coding block can be just derived from a neighbor block, a merge mode is applicable. Hence, in case that a corresponding coding block is coded using inter prediction, only merge index information can be signaled through a bitstream for the corresponding coding block. Such a mode is referred to as a merge skip mode. Namely, in the merge skip mode, syntax information for a coded lock is not signaled except merge index information (e.g., merge_idx). Yet, in order to indicate that it is unnecessary to further obtain syntax information except the merge index information (e.g., merge_idx) for the corresponding coding block, skip flag information may be signaled through a bitstream. In the present specification, the skip flag information may be referred to as cu_skip_flag. The decoder obtains skip flag information for the coding block from a slice not in intra coding mode and is able to reconstruct the coding block in the merge skip mode according to the skip flag information.

If a merge indication mode does not indicate that inter prediction parameter information of a current prediction block is derived from a neighbor block, an inter prediction parameter of a current prediction block may be signaled through a bitstream. Reference index information for a reference picture list 0 and/or reference index information for a reference picture list 1 can be signaled through a bitstream depending on whether it is L0 and/or L1 prediction of the current prediction block. Regarding motion vector information, information indicating a motion vector difference and information indicating a motion vector prediction value (predictor) can be signaled through a bitstream. The information indicating the motion vector predictor is index information indicating a candidate used as a motion vector prediction value of a current block in a motion vector predictor candidate list constructed with motion vectors of neighbor blocks, and may be referred to as motion vector predictor indication information. The motion vector predictor indication information may be represented as mvp_10_flag or mvp_11_flag for example. The decoder obtains a motion vector predictor based on motion vector predictor indication information, finds a motion vector difference by obtaining information related to a motion vector difference from a bitstream, and is able to find motion vector information for a current block using the motion vector predictor and the motion vector difference.

If a current coding block is coded using inter prediction, the identical/similar principle may apply to a transform block except that inter prediction is performed by a prediction block unit. Hence, in case of coding a current coding block using inter prediction, the current coding block is partitioned into at least one transform block by a quadtree scheme, transform coefficient information is obtained based on coded block indication information (e.g., cbf_luma, cbf_cb, cbf_cr) for each partitioned transform block, and a residual can be obtained by performing dequantization and inverse transform on the obtained transform coefficient information.

In case that a current coding block is coded in intra prediction mode, the decoder finds a prediction value for the current coding block by finding a prediction value by prediction block unit and/or is able to find a residual for the current coding block by finding a residual by transform block unit. The decoder can reconstruct the current coding block using the prediction value and/or residual for the current coding block.

Proposed Method

As aforementioned, although a prediction block can use one of motion vector candidates of a spatial/temporal neighbor block as a motion vector predictor (MVP), it may happen that a motion vector of a neighbor block is not appropriate as a representative motion vector of a current block. Namely, although a region in the current block close to a location of a candidate block has high correlation with a motion vector of the candidate block, a region relatively remoter from the candidate block may have lower correlation.

In case of MERGE/SKIP mode (or, merge skip mode), although motion information of a merge candidate indicated by merge index information (e.g., merge_idx) among temporal/spatial neighbor blocks of a current block is applicable to the current block, a region in the current block close to a candidate block has high correlation with inter prediction information of the candidate block but a region relatively remote from the candidate block may have low correlation. Therefore, motion information of a merge candidate indicated by merge index information in merge skip mode may not secure optimal prediction performance on a current block.

Accordingly, the present invention proposes to use a multitude of motion candidate vectors of a neighbor block as a candidate motion vector for a current block in MERGE/SKIP mode (or, merge skip mode). In particular, in merge skip mode, the present invention proposes to use inter prediction parameter information of a plurality of neighbor blocks instead of using inter prediction parameter information (e.g., motion vector of a neighbor block indicated by merge index information, reference picture index information, prediction list use flag information (e.g., predFlagL0, predFlagL1)) of one of neighbor blocks of a current block.

As aforementioned, according to the existing HEVC standard, a merge skip mode is applied by coding block unit and skip flag information for a coding block is signaled through a bitstream to indicate whether the merge skip mode is applied. If the skip flag information indicates that the merge skip mode is applied to the coding block, the corresponding coding block is not partitioned into a plurality of prediction blocks and the rest of syntax information except merge index information for the corresponding coding block is not signaled. Namely, if the merge skip mode is applied to the corresponding coding block, only the merge index information (e.g., merge_idx) for the coding block is signaled through a bitstream.

Therefore, in merge skip mode, a decoder obtains merge index information from a bitstream and performs an inter prediction for a current coding block using an inter prediction parameter (e.g., motion vector, reference picture index, and or prediction list use flag information (e.g., predFlagL0, predFlagL1)) of a neighbor block indicated by the merge index information among (spatial and/or temporal) neighbor blocks adjacent to the current coding block.

On the other hand, according to the present invention, although a merge skip mode is applied, a current coding block is partitioned into a plurality of subblocks in consideration of a distance (or location) from a candidate block and an inter prediction parameter of at least one neighbor block adjacent to the current coding block can be applied to each subblock of the current coding block. Hence, although the merge skip mode is applied, correlation between each subblock of the current coding block and the candidate block can be raised.

In the present invention, a candidate block may correspond to a merge candidate for a merge mode or a merge skip mode. For example, as aforementioned, a candidate block of the present invention may include a spatial neighbor block including a left neighbor block, an upper neighbor block, an upper-left neighbor block, a lower-left neighbor block, and an upper-right neighbor block, which are adjacent to a current block in a picture including the current block, and a temporal neighbor block located (or, co-located) at a position corresponding to a current block in a picture different from the picture including the current block.

For another example, a candidate block in the present invention may correspond to a neighbor block available among the merge candidates. If a neighbor block is available (for inter prediction), it may refer to a case that the corresponding neighbor block exists in a picture including a current block, that the corresponding neighbor block exists in the same slide or tile of the current block, and that the corresponding neighbor block is coded in inter prediction mode. The tile refers to a rectangular region including at least one coding tree block or unit within a picture.

Figure 7:
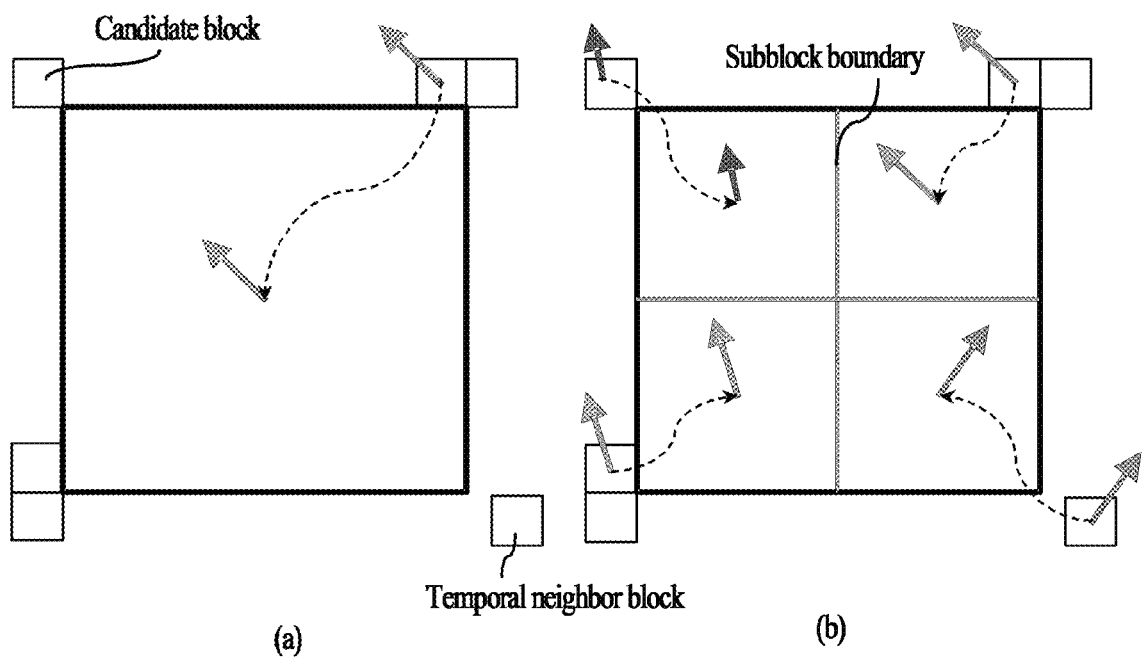
FIG. 7 illustrates a merge skip mode according to the present invention.

FIG. 7 shows a merge skip mode according to the present invention. FIG. 7 (a) shows an example of a merge skip mode according to the existing HEVC standard, and FIG. 7 (b) shows an example of a merge skip mode according to the present invention. FIG. 7 (b) just shows an example of partitioning a current block (e.g., a coding block) into 4 subblocks, by which the present invention is non-limited.

Referring to FIG. 7 (a), 5 spatial neighbor blocks adjacent to a current block (e.g., a coding block) and 1 spatial neighbor block are illustrated for example. The spatial neighbor blocks may include a top neighbor block, a top left neighbor block, a top right neighbor block, a left neighbor block, and a bottom left neighbor block, which are adjacent to the current block. And, the temporal neighbor block may correspond to a block located (or, co-located) at a position corresponding to the current block in a picture different from a picture including the current block. In the example of FIG. 7 (a), assuming that merge index information of the current block indicates the top neighbor block among the candidate blocks according to the existing HEVC standard, inter prediction can be performed by applying inter prediction parameter information of the top neighbor block to the current coding block.

Referring to FIG. 7 (b), if a merge skip mode is applied to a current block (e.g., a coding block) according to the present invention, the current block is partitioned into 4 subblocks, inter prediction parameter information of a top left neighbor block is applied to a top left subblock among the 4 subblocks, inter prediction parameter information of a top neighbor block is applied to a top right subblock among the 4 subblocks, inter prediction parameter information of a left neighbor block is applied to a bottom left subblock among the 4 subblocks, and inter prediction parameter information of a temporal neighbor block is applied to a bottom right subblock among the 4 subblocks.

According to the present invention, as shown in FIG. 7 (b) for example, using a multitude of motion vectors based on a distance (or position) from a candidate block, it is able to raise prediction accuracy of a current block. In particular, although a merge skip mode is applied, it is able to improve accuracy of inter prediction in a manner of partitioning a current block into a plurality of subblocks and then applying inter prediction parameter information of a candidate block having high correlation.

Moreover, according to the present invention, by replacing a partitioning mode under 2N×2N with additional bit allocation for a multiple motion vector, it is able to obtain an effect that bits for merge flag information (e.g., merge_flag), merge index information (e.g., merge_index), partition indication information (e.g., split_cu_flag) for a coding block and the like and an effect that coding efficiency is improved.

Particularly, in case of a merge skip mode according to the present invention, merge index information indicating one of merge candidates may not be signaled. In the present invention, a coding block is partitioned into a plurality of subblocks and inter prediction parameter information of a neighbor block of a current block can be applied to each of the subblocks. Therefore, without signaling merge index information according to the existing HEVC standard, it is able to determine a candidate block having inter prediction parameter information that is to be applied to a current block. Hence, according to the present invention, as a bit for merge index information can be saved, coding efficiency can be improved.

Moreover, according to the present invention, the same effect can be obtained without additionally partitioning a coding block by a quadtree scheme. Therefore, as a bot for partition indication information (e.g., split_cu_flag) required for additionally partitioning a coding block can be saved, coding efficiency can be improved.

Subblock Partitioning Method

In the present invention, a current block (e.g., a coding block) is partitioned into subblocks and multiple motion vectors can be applied to the subblocks. Hence, an inter prediction according to the present invention may include partitioning a current block (e.g., a coding block) into a plurality of subblocks, obtaining inter prediction parameter information for a corresponding subblock from a neighbor block adjacent to the corresponding subblock among neighbor blocks of the current block for each of the plurality of subblocks, and applying the obtained inter prediction parameter information to the corresponding subblock.

For example, as a partitioning method of a current block (or, a partitioning mode), 2N×2N, 2N×N, N×2N, N×N, 2N×nU, 2N×nD, nL×2N, and nR×2N are available (e.g., refer to a partitioning mode of a coding block, part mode), they are provided for example only. And, the current block can be partitioned into various numbers of subblocks and/or subblocks in various shapes.

Particularly, in the present invention, a current block can be partitioned into subblocks by applying at least one of methods (1-a) to (1-e) in the following according to a position of a neighbor block.

(1-a) A current block is partitioned into an arbitrary number.

(1-b) A current block is partitioned in arbitrary shape.

(1-c) A current block is partitioned by quadtree scheme.

(1-d) A current block is partitioned by an asymmetry quadtree scheme.

(1-e) Partitioning is performed by a combination of the above method.

A partitioning method of a current block (or, a partitioning mode) may be defined in advance between an encoder and a decoder or signaled through a bitstream. For example, in case of a signaling through a bitstream, information (e.g., part_mode) indicating a partitioning mode of a coding block in merge skip mode can be signaled by a unit of SPS, PPS, slice header, CTU, or CU. Hence, if a partitioning method of a current block (or, a partitioning mode) is signaled through a bitstream, a decoder obtains indication information at the level of SPS, PPS, slice header, CTU, or CU and is then able to apply it as a partitioning mode of a corresponding coding block.

For another example, if a partitioning method of a current block (or, a partitioning mode) is defined in advance, a partitioning method (or, a partitioning mode) can be defined according to a position of a neighbor block available among neighbor blocks of the current block. A partitioning method (or, a partitioning mode) according to a position of an available neighbor block is described in detail with reference to FIG. 8.

Figure 8:
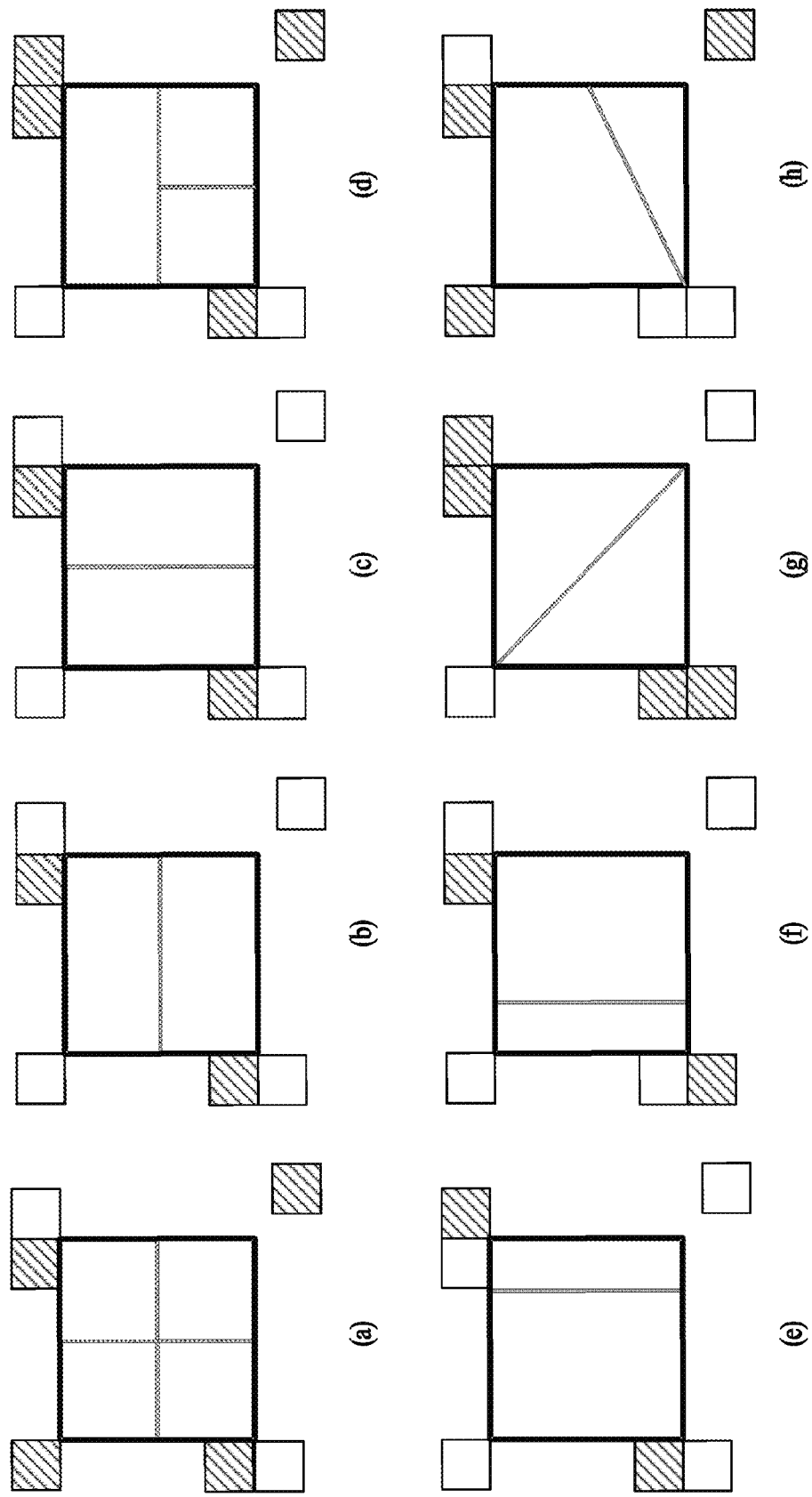
FIG. 8 illustrates an example of a partitioning method of a coding block according to the present invention.

FIG. 8 shows an example of a partitioning method of a coding block according to the present invention. In the example shown in FIG. 8, a hatched candidate block indicates a candidate block from which inter parameter information applicable to a corresponding subblock will be obtained.

Referring to FIG. 8 (a), a current block can be partitioned into 4 subblocks in equal size by a quadtree scheme. In this case, for example, a partitioning method of a current block may correspond to PART_N×N partitioning mode. Moreover, inter prediction on a current block can be performed in a manner of applying inter prediction parameter information of a top left neighbor block adjacent to the current block to a top left subblock among the 4 subblocks, applying inter prediction parameter information of a top neighbor block adjacent to the current block to a top right subblock among the 4 subblocks, applying inter prediction parameter information of a left neighbor block adjacent to the current block to a bottom left subblock among the 4 subblocks, and applying inter prediction parameter information of a temporal neighbor block to a bottom right subblock among the 4 subblocks.

Or, the partitioning method of the coding block shown in FIG. 8 (a) may be defined in advance between an encoder and a decoder so as to be applicable to a case that a top left neighbor block, a top neighbor block, a left neighbor block and a temporal neighbor block, which are adjacent to a current block (e.g., a coding block), are available.

As a modified example of FIG. 8 (a), inter prediction may be performed in a manner that inter prediction parameter information of a top right neighbor block adjacent to a current block instead of a top neighbor block adjacent to the current block is applied to a top right subblock among the 4 subblocks. Such a modified example may be defined beforehand so as to be applied to a case that a top right neighbor block is available. Similarly, as a modified example of FIG. 8 (a), for example, inter prediction can be performed in a manner of applying inter prediction parameter information of a bottom left neighbor block adjacent to the current block instead of the left neighbor block adjacent to the current block to a bottom left subblock among the 4 subblocks. Such a modified example may be defined beforehand so as to be applied to a case that a bottom left neighbor block is available.

Referring to FIG. 8 (b), a current block can be partitioned into 2 rectangular blocks long in width. In this case, for example, a partitioning scheme of the current block may correspond to PART_2N×N partitioning mode. Moreover, for example, inter prediction on the current block can be performed in a manner of applying inter prediction parameter information of a top neighbor block adjacent to the current block to a top subblock of the two subblocks and applying inter prediction parameter information of a left neighbor block adjacent to the current block to a bottom subblock of the two subblocks.

Or, the coding block partitioning method shown in FIG. 8 (b) may be defined beforehand between an encoder and a decoder so as to be applied to a case that a top neighbor block and a left neighbor block, which are adjacent to a current block (e.g., a coding block), are available.

Referring to FIG. 8 (c), a current block can be partitioned into 2 rectangular blocks long in length. In this case, for example, a partitioning scheme of the current block may correspond to PART_N×2N partitioning mode. Moreover, for example, inter prediction on the current block can be performed in a manner of applying inter prediction parameter information of a left neighbor block adjacent to the current block to a left subblock of the two subblocks and applying inter prediction parameter information of a top neighbor block adjacent to the current block to a right subblock of the two subblocks.

Or, the coding block partitioning method shown in FIG. 8 (c) may be defined beforehand between an encoder and a decoder so as to be applied to a case that a top neighbor block and a left neighbor block, which are adjacent to a current block (e.g., a coding block), are available.

Referring to FIG. 8 (d), a current block can be partitioned into 3 subblocks including a width-ling rectangular block on a top side and 2 square blocks on a bottom side. In this case, for example, inter prediction on the current block can be performed in a manner of applying a representative value (e.g., average value, minimum value, maximum value) of inter prediction parameter informations of a top neighbor block and a top right neighbor block adjacent to the current block to a top subblock among the 3 subblocks, applying inter prediction parameter information of a left neighbor block adjacent to the current block to a bottom left subblock among the 3 subblocks, and applying inter prediction parameter information of a temporal neighbor block to a bottom right subblock among the 3 subblocks.

Or, the coding block partitioning method shown in FIG. 8 (d) may be defined beforehand between an encoder and a decoder so as to be applied to a case that a top neighbor block, a top right neighbor block, a left neighbor block and a temporal neighbor block, which are adjacent to a current block (e.g., a coding block), are available.

Referring to FIG. 8 (e), a current block can be partitioned into 2 rectangular blocks long in length. In this case, for example, a partitioning scheme of the current block may correspond to PART_nR×2N partitioning mode. Moreover, for example, inter prediction on the current block can be performed in a manner of applying inter prediction parameter information of a left neighbor block adjacent to the current block to a left subblock of the two subblocks and applying inter prediction parameter information of a top neighbor block adjacent to the current block to a right subblock of the two subblocks.

Or, the coding block partitioning method shown in FIG. 8 (e) may be defined beforehand between an encoder and a decoder so as to be applied to a case that a top right neighbor block and a left neighbor block, which are adjacent to a current block (e.g., a coding block), are available.

Referring to FIG. 8 (f), a current block can be partitioned into 2 rectangular blocks long in length. In this case, for example, a partitioning scheme of the current block may correspond to PART_nL×2N partitioning mode. Moreover, for example, inter prediction on the current block can be performed in a manner of applying inter prediction parameter information of a bottom left neighbor block adjacent to the current block to a left subblock of the two subblocks and applying inter prediction parameter information of a top neighbor block adjacent to the current block to a right subblock of the two subblocks.

Or, the coding block partitioning method shown in FIG. 8 (f) may be defined beforehand between an encoder and a decoder so as to be applied to a case that a top right neighbor block and a bottom left neighbor block, which are adjacent to a current block (e.g., a coding block), are available.

Referring to FIG. 8 (g), a current block can be partitioned into 2 right triangles. Here, a boundary between the two right triangles may be a diagonal connecting a top left corner to a bottom right corner of the current block. In this case, for example, inter prediction can be performed in a manner of applying inter prediction parameter information of at least one of a top neighbor block and a top right neighbor block adjacent to the current block or a representative value (e.g., average value, minimum value, maximum value) thereof to a top subblock of the 2 subblocks and applying inter prediction parameter information of at least one of a left neighbor block and a bottom left neighbor block adjacent to the current block or a representative value (e.g., average value, minimum value, maximum value) thereof to a bottom subblock of the 2 subblocks.

Or, the coding block partitioning method shown in FIG. 8 (g) may be defined beforehand between an encoder and a decoder so as to be applied to a case that a top right neighbor block, a top right neighbor block, a left neighbor block and a bottom left neighbor block, which are adjacent to a current block (e.g., a coding block), are available.

Referring to FIG. 8 (h), a current block can be partitioned into 2 subblocks in random shapes. In this case, for example, inter prediction can be performed in a manner of applying inter prediction parameter information of at least one of a top left neighbor block and a top neighbor block or a representative value (e.g., average value, minimum value, maximum value) thereof to a top subblock of the 2 subblocks and applying inter prediction parameter information of a temporal neighbor block to a bottom subblock of the 2 subblocks.

Or, the coding block partitioning method shown in FIG. 8 (h) may be defined beforehand between an encoder and a decoder so as to be applied to a case that a top left neighbor block, a top neighbor block and a temporal block, which are adjacent to a current block (e.g., a coding block), are available.

The examples shown in FIG. 8 are illustrated only and the partitioning scheme according to the present invention is non-limited by the examples shown in FIG. 8.

Motion Vector Derivation

A process for deriving a value for a subblock of a current block using a motion vector of a neighbor block of the current block (e.g., coding block) is described. In particular, in case of partitioning a current block (e.g., a coding block) into a plurality of subblocks in consideration of a position and/or availability of a candidate block, proposed is a method of deriving a motion vector to apply to a current subblock using a motion vector of a neighbor block.

A motion vector of a neighbor block for a subblock of a current block may be used intactly or become a representative value between candidate motion vectors. In particular, according to the present invention, inter prediction parameter information of a specific neighbor block adjacent to a specific subblock of a current block among neighbor blocks of the current block can be assigned as inter prediction parameter information for the specific subblock. For example, if a single neighbor block among neighbor blocks of a current block (e.g., a coding block) is adjacent to a specific subblock of the current block, a motion vector of the single neighbor block can be applied for the specific subblock.

Or, according to the present invention, a representative value of inter prediction parameter information of a neighbor block adjacent to a specific subblock of a current block among neighbor blocks of the current block can be assigned as inter prediction parameter information for the specific subblock. For example, if a plurality of neighbor blocks among neighbor blocks of a current block (e.g., a coding block) is adjacent to a specific subblock of the current block, a representative value (e.g., a median, an average, a mode (or modal value), a minimum, a maximum) of motion vectors of the plurality of neighbor blocks can be applied for the specific subblock.

Moreover, if a neighbor block corresponding to a specific subblock of a current block (e.g., a coding block) is not available, inter prediction parameter information of the corresponding unavailable neighbor block is generated using inter prediction parameter information of an available neighbor block or inter prediction parameter information of the corresponding unavailable neighbor block can be set to a default value (e.g., 0). For example, in order to generate a motion vector for a neighbor block of which motion vector is not available, a motion vector of a neighbor block located at another position is used, a new motion vector obtained through a scaling between candidate motion vectors is used, or a zero vector is used.

For example, a candidate motion vector to be applied to a subblock of a current block can be generated by applying at least one of the following methods (2-a) to (2-g).

(2-a) A motion vector of a neighbor block is used as it is.

(2-b) A motion vector of a neighbor block is used as a motion vector at another position instead.

(2-c) A representative value of a neighbor block is used. A representative value may include a mode (or modal value), a minimum, an average or a median between neighbor blocks adjacent to a current block.

(2-d) A zero vector is used.

(2-e) Used is a motion vector obtained through a scaling in consideration of a distance ratio of a position, at which a motion vector is intended to be generated, and an available neighbor block.

(2-f) When a motion vector for an unavailable subblock is generated, a motion vector obtained through a scaling in consideration of a PCO (picture order count) distance ratio of a reference picture in motion information of an available neighbor block. In doing so, a final motion vector for a current subblock is generated through a scaling, or motion information of each available neighbor block is used for the usage of scaling only.

(2-e) A candidate motion vector is generated by a combination of at least two of (2-a) to (2-f).

Figure 9:
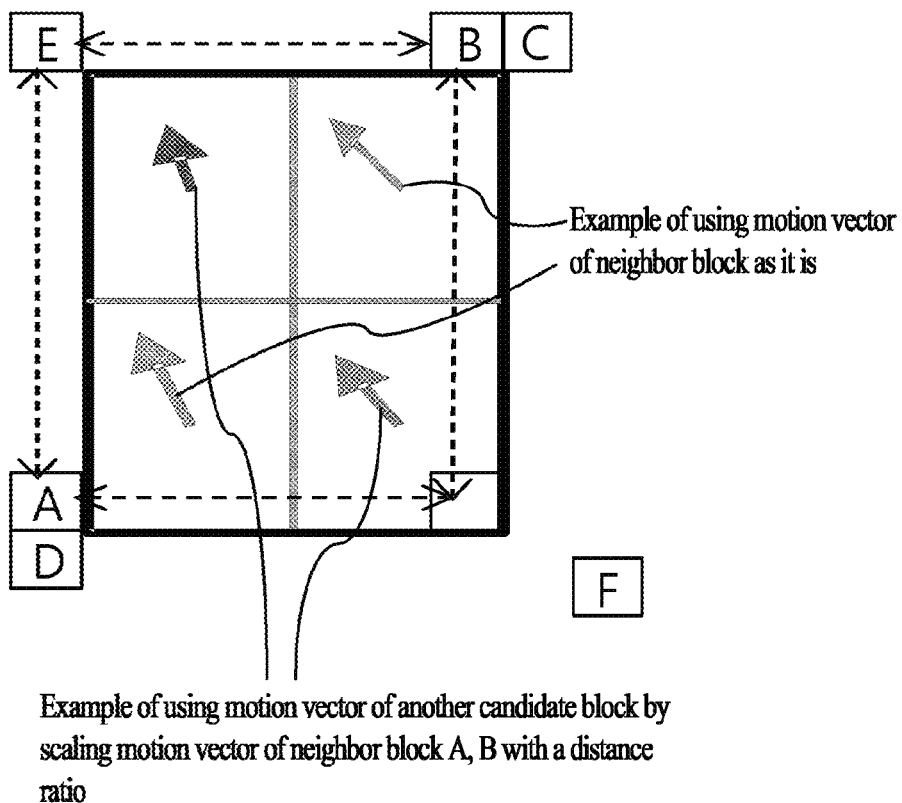
FIGS. 9 to 11 illustrate examples of deriving a motion vector for a subblock of a current block according to the present invention.
Figure 10:
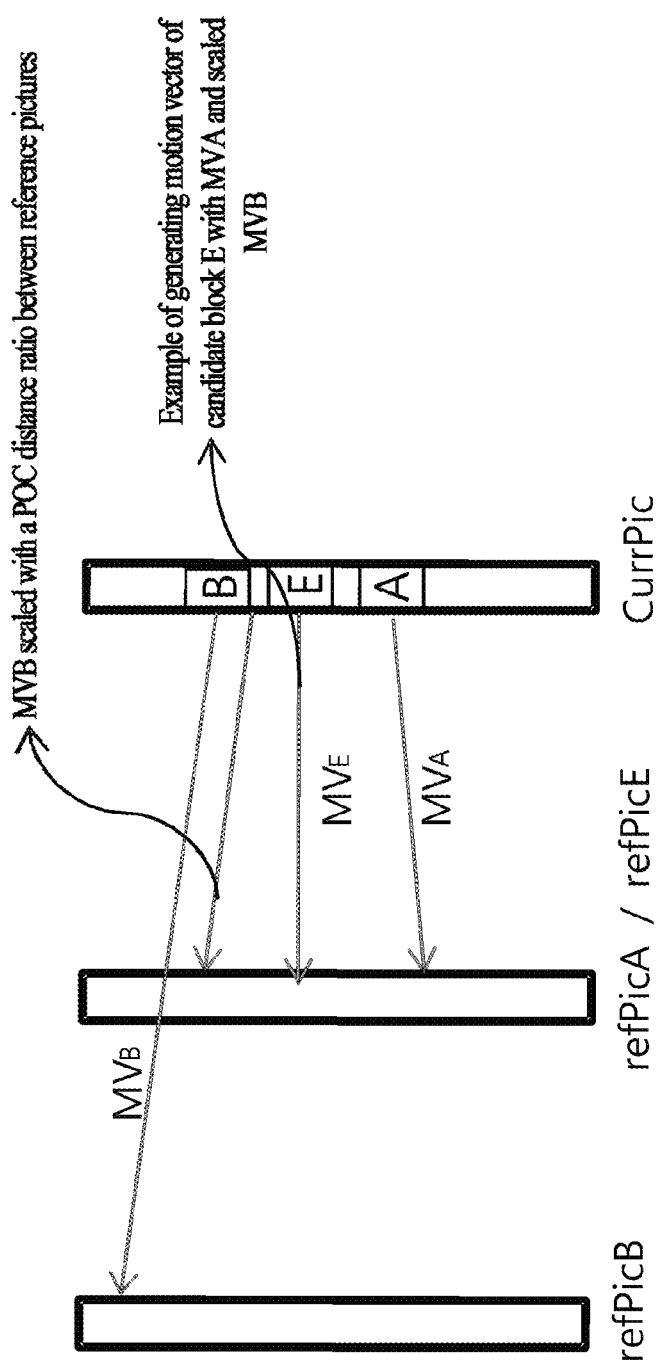
Figure 11:
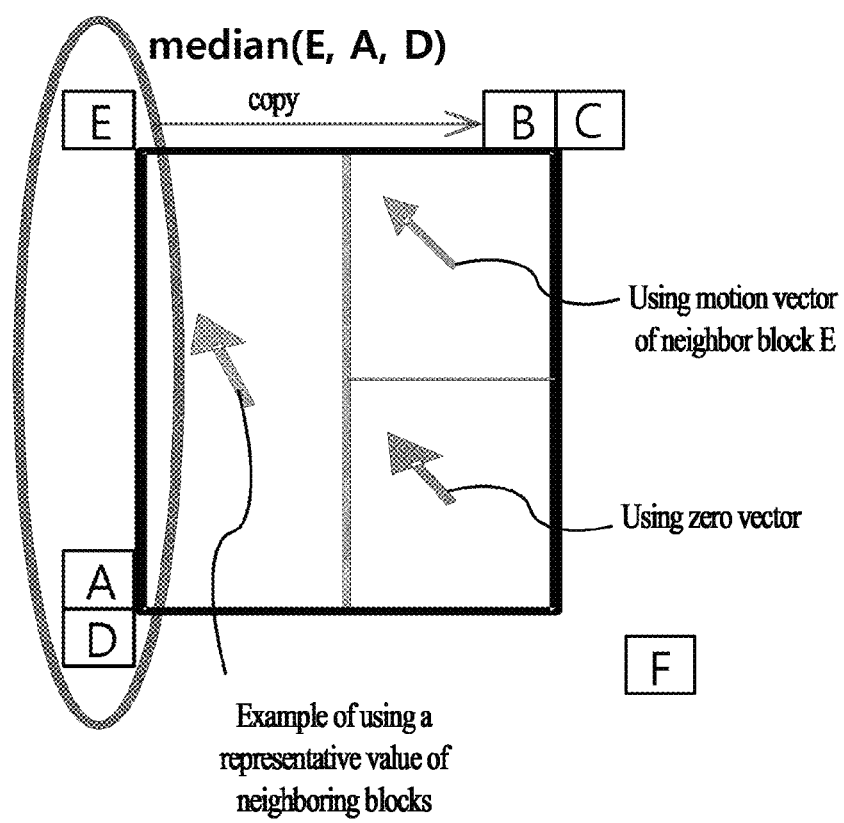

FIGS. 9 to 11 show examples of deriving a motion vector for a subblock of a current block according to the present invention. Examples shown in FIGS. 9 to 11 are illustrated only. Although a different partitioning method (or mode) is applied to a current block (e.g., a coding block), the present invention is applicable identically/similarly.

Referring to FIG. 9, a current block (e.g., a coding block) may be partitioned into 4 subblocks by a quadtree scheme according to the present invention. In the example of FIG. 9, as described with reference to FIG. 8 9a), each subblock of a current block can correspond to a neighbor block of the current block.

A motion vector of a top left neighbor block E is generated by scaling a motion vector of an available neighbor block (B, A) at a distance ratio and a representative value (e.g., median, average, mode (or modal value), minimum, maximum) of the generated motion vector can be applied to a corresponding subblock. In particular, if a reference picture of a neighbor block E is different from that of a neighbor block B, a motion vector of the neighbor block B can be scaled using a ratio between a POC of the reference picture of the neighbor block E and a POC of the reference picture of the neighbor block B. Similarly, if a reference picture of a neighbor block E is different from that of a neighbor block A, a motion vector of the neighbor block A can be scaled using a ratio between a POC of the reference picture of the neighbor block E and a POC of the reference picture of the neighbor block A. Thereafter, based on a motion vector (or, a scaled motion vector) of a neighbor block A or B (e.g., using a representative value), it is able to generate a motion vector of the neighbor block E. As illustrated in FIG. 9, the generated motion vector of the neighbor block E is applied to a top left subblock of the current block, whereby inter prediction on the corresponding subblock can be performed.

In a manner similar to the above, a motion vector for a temporal neighbor block F can be generated by applying a scaling based on a motion vector of a neighbor block A or B. The generated motion vector is applied to a bottom right subblock of a current block, whereby inter prediction can be performed.

For example, as illustrated in FIG. 9, if a motion vector of a neighbor block E or F is generated using a motion vector of another neighbor block A or B of a current block, it is applicable to a case that the neighbor block E or F of the current block is not available as well as to a case that the neighbor block E or F of the current block is available. If the neighbor block E or F is not available, a reference picture of the neighbor block E or F is set equal to that of the current block, whereby a scaling can be performed on the motion vector of the neighbor block A or B.

As illustrated in FIG. 9, inter prediction can be performed on a top right subblock of the current block by intactly applying the motion vector of the top neighbor block B adjacent to the current block, and inter prediction can be performed on a bottom left subblock of the current block by intactly applying the motion vector of the left neighbor block A adjacent to the current block.

FIG. 10 illustrates a scaling method according to the present invention. In the example of FIG. 10, although a reference picture of a neighbor block A is assumed as equal to that of a neighbor block E, if the reference picture of the neighbor block A is different from that of the neighbor block E, a motion vector of the neighbor block A can be scaled.

Referring to FIG. 10, since a reference picture of a neighbor block B is different from that of a neighbor block E, a motion vector $MV_B$ of the neighbor block B can be scaled using a ratio of a distance (or, a POC value difference) between the neighbor block B and a current picture (or, a picture containing a current block) to a distance (or, a POC value difference) between the neighbor block E and the current picture. Using the scaled motion vector $MV_B$ of the neighbor block B and a motion vector $MV_A$ of the neighbor block A, it is able to generate a motion vector $MV_E$ of the neighbor block E. For example, the motion vector $MV_E$ of the neighbor block E can be generated as a representative value (e.g., average, minimum, maximum) of the motion vector $MV_B$ of the neighbor block B and the motion vector $MV_A$ of the neighbor block A.

Referring to FIG. 11, a current block can be partitioned into 3 subblocks including a length-ling rectangular subblock on a left side and 2 subblocks on a right side. To the subblock on the left side, a representative value (e.g., median, average, mode (or modal value), minimum, maximum) of motion vectors of a top left neighbor block E, a left neighbor block A and a bottom left neighbor block D, which are adjacent to the current block, can be applied.

In the example of FIG. 11, although a motion vector of a top neighbor block B adjacent to the current block is applicable to a top right subblock of the current block, a motion vector of another neighbor block or a representative value of the motion vector can be applied for one example of the present invention. In the example of FIG. 11, the motion vector of the top left neighbor block E adjacent to the current block is copied and then applied to a top left subblock of the current block. For example, if a motion vector of another neighbor block E is copied and applied instead, it is applicable to a case that the corresponding neighbor block B is unavailable or available.

Moreover, in the example of FIG. 11, to a bottom right subblock of the current block, a zero motion vector can be applied instead of a motion vector of a temporal neighbor block F. For example, if a zero motion vector is copied and applied instead, it is applicable to a case that the corresponding neighbor block F is unavailable or available.

Reference Picture Information Derivation

Described is a process for deriving a value for a subblock of a current block using a reference list (or, reference picture list) and a reference index (or, reference picture index) of a neighbor block of a current block. In particular, if a current block (e.g., a coding block) is partitioned into a plurality of subblocks, a method of deriving a reference picture index and/or a reference picture list to apply to a current subblock using a reference picture index and/or a reference picture list of a neighbor block corresponding to the current block is proposed.

As a reference list and a reference index for a current block, a reference list and a reference index of a neighbor block are used identically or a representative value of candidate blocks can be used. A reference list and reference indexes of the candidate blocks are used by being combined together. Or, if the candidate block is a temporal motion vector (TMVP), it is used by being scaled at a ratio of a distance from a POC of a reference picture of another neighbor block. And, the same value may be applicable to all subblocks.

For example, a candidate reference list and a reference index, which are to be applied to a subblock of a current block, can be generated by applying at least one of the following methods (3-a) to (3-f).

(3-a) A reference list and a reference index of a neighbor block are used intactly.

(3-b) A reference list and a reference index of a neighbor block are used as values of another position.

(3-c) A representative value of a neighbor block is used. For example, a representative value may be found as a mode (or modal value) or a minimum between candidate blocks.

(3-d) A representative value of an ambient block is equally applied to all or some of subblocks.

(3-e) A reference index of a reference list 0 (or 1) in an ambient block is applied as a value of another candidate block using a reference index of a reference list 1 (or 0) in another ambient block.

(3-f) A candidate motion vector is generated by a combination of at least two of (3-a) to (3-e).

Signaling Method

In case that a merge skip mode is applied to a current block (e.g., a coding block), whether multiple motion information according to the present invention is used can be signaled through a bitstream. A signaling method for having multiple motion information by partitioning a current block into subblocks is described as follows.

Information indicating whether multiple motion information is used can be referred to as multiple motion indication information or multiple motion flag information and can be signaled by at least one of methods (4-a) to (4-i). For example, if a value of multiple motion indication information is 1, a current block (e.g., a coding block) is partitioned into a plurality of subblocks and inter prediction parameter information of a neighbor block of the current block is applied multiply. If the value is 0, multiple motion information of the present invention may not be applied. This is exemplary only. Such multiple motion information of the present invention may be referred to as another name. A value of such multiple motion information may be set to a reverse value or a different value.

(4-a) Whether multiple motion information is used can be signaled through SPS (sequence parameter set). The information signaled through SPS is applicable to all sequences included in a sequence of pictures.

(4-b) Whether multiple motion information is used can be signaled through PPS (picture parameter set). The information signaled through PPS is applicable to a PPS applied picture.

(4-c) Whether multiple motion information is used can be signaled through APS (adaptation parameter set). The information signaled through is applicable to an APS applied picture.

(4-d) Whether multiple motion information is used can be signaled through a slice header. The information signaled through a slice header is applicable to a corresponding slice.

(4-e) Whether multiple motion information is used can be signaled by LCU (Largest Coding Unit). LCU refers to CTU (Coding Tree Unit). Hence, information signaled through LCU is applicable to a corresponding CTU.

(4-f) Whether multiple motion information is used can be signaled by a region unit. The region may refer to an arbitrary region instead of CTU, CU, or PU. In this case, it is applicable to CTU, CU, TU, and PU included in the corresponding region.

(4-g) Whether multiple motion information is used can be signaled by CU unit. Information signaled through CU is applicable to the corresponding CU.

(4-h) Whether multiple motion information is used can be signaled by PU unit. Information signaled through PU is applicable to the corresponding PU.

(4-i) Signaling can be performed by increasing the number of merge candidates. If the number of the merge candidates is increased, multiple motion application according to the present invention is added as a new merge candidate to a merge candidate list. For example, a candidate corresponding to the multiple motion application according to the present invention may be added to the last of the existing merge candidate list. In this case, for example, merge index information may be signaled like the existing merge mode. If the signaled merge index information indicates multiple motion application according to the present invention, by partitioning a current block into a plurality of subblocks by applying the present invention and then applying inter prediction parameter information to a neighbor block of the current block to each subblock, inter prediction can be performed on each subblock. If the signaled merge index information indicates one of the existing merge candidates, inter prediction can be performed by applying inter prediction parameter information of a neighbor block indicated by the merge index information among the merge candidates to the current block without partitioning the current block (Existing merge mode applied).

As described above, the present invention is applicable to a case that a current block (e.g., a coding block) is coded in merge skip mode. Therefore, the present invention is applicable if prediction mode indication information (e.g., pred_mode_flag) on the current block indicates that the current block is coded in inter prediction mode. Moreover, the present invention is applicable if skip flag information for a current block (e.g., a coding block) indicates that the current block is coded in skip mode. Therefore, the proposed method according to the present invention is applicable to a case that pred_mode_flag is INTER in FIG. 5, and the rest of the encoding/decoding process can be performed by the process described with reference to FIGS. 1 to 6.

Figure 12:
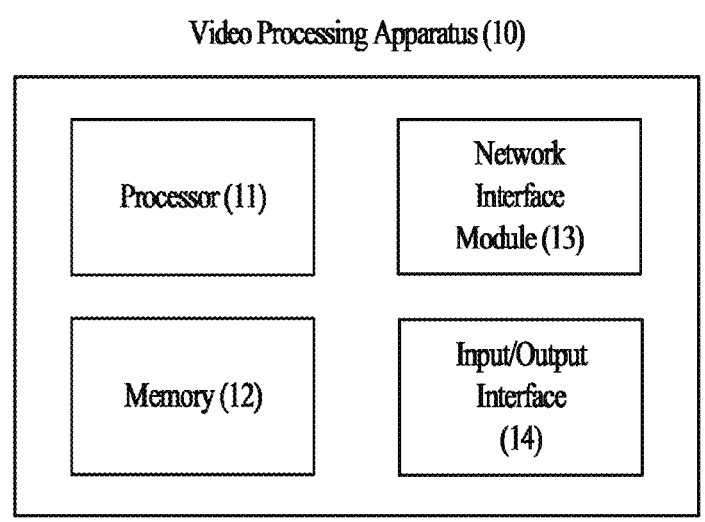
FIG. 12 illustrates a block diagram of a video processing apparatus to which the present invention can be applied.

FIG. 12 illustrates a block diagram to which the present invention can be applied. The video processing apparatus may include an encoding apparatus and/or a decoding apparatus of a video signal. For example, the video processing apparatus to which the present invention can be applied may include a mobile terminal such as a smart phone, a mobile equipment such as a laptop computer, a consumer electronics such as a digital TV, a digital video player, and etc.

A memory 12 may store program for processing and controlling by a processor 11, and may store a coded bitstream, a reconstructed image, control information, and the like. Further, the memory 12 may be used as a buffer for various video signals. The memory 12 may be implemented as a storage device such as a ROM (Read Only Memory), RAM (Random Access Memory), EPROM (Erasable Programmable Read Only Memory), EEPROM (Electrically Erasable Programmable Read-Only Memory), a flash memory, SRAM (Static RAM), HDD (Hard Disk Drive), SSD (Solid State Drive), and etc.

The processor 11 controls operations of each module in the video processing apparatus. The processor 11 may perform various control functions to perform encoding/decoding according to the present invention. The processor 11 may be referred to as a controller, a microcontroller, a microprocessor, a microcomputer, or etc. The processor 11 may be implemented as a hardware or a firmware, a software, or a combination thereof. When the present invention is implemented using a hardware, the processor 11 may comprise ASIC (application specific integrated circuit), DSP (digital signal processor), DSPD (digital signal processing device), PLD (programmable logic device), FPGA (field programmable gate array), or the like. Meanwhile, when the present invention is implemented using a firmware or a software, the firmware or software may comprise modules, procedures, or functions that perform functions or operations according to the present invention. The firmware or software configured to perform the present invention may be implemented in the processor 11 or may be stored in the memory 12 and executed by the processor 11.

In addition, the apparatus 10 may optionally include a network interface module (NIM) 13. The network interface module 13 may be operatively connected with the processor 11, and the processor 11 may control the network interface module 13 to transmit or receive wireless/wired signals carrying information, data, a signal, and/or a message through a wireless/wired network. For example, the network interface module 13 may support various communication standards such as IEEE 802 series, 3GPP LTE(-A), Wi-Fi, ATSC (Advanced Television System Committee), DVB (Digital Video Broadcasting), and etc, and may transmit and receive a video signal such as a coded bitstream and/or control information according to the corresponding communication standard. The network interface module 13 may not be included as necessary.

In addition, the apparatus 10 may optionally include an input/output interface 14. The input/output interface 14 may be operatively connected with the processor 11, and the processor 11 may control the input/output interface 14 to input or output a control signal and/or a data signal. For example, the input/output interface 14 may support specifications such as USB (Universal Serial Bus), Bluetooth, NFC (Near Field Communication), serial/parallel interface, DVI (Digital Visual Interface), HDMI (High Definition Multimedia Interface) so as to be connected with input devices such as a keyboard, a mouse, a touchpad, a camera and output devices such as a display.

The embodiments of the present invention described above are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by a subsequent amendment after the application is filed.

The embodiments of the present invention may be implemented by various means, for example, hardware, firmware, software, or a combination thereof. In a hardware implementation, an embodiment of the present invention may be implemented by one or more application specific integrated circuits (ASICs), digital signal processors (DSPs), digital signal processing devices (DSDPs), programmable logic devices (PLDs), field programmable gate arrays (FPGAs), processors, controllers, microcontrollers, microprocessors, etc.

In a firmware or software implementation, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

The present invention can be applied to a video processing apparatus such as a decoding apparatus or an encoding apparatus.

What is claimed is:

1. A method of decoding a bitstream for a video signal by a decoding device, the method comprising:
    obtaining first flag information for a current coding block from the bitstream, wherein the first flag information indicates whether the current coding block is coded in a skip mode;
    obtaining, based on the first flag information indicating that the current coding block is coded in the skip mode, second flag information for the current coding block from the bitstream, wherein the second flag information indicates whether the current coding block has multiple inter parameter information based on subblocks of the current coding block;
    partitioning, based on the second flag information indicating that the current coding block has multiple inter parameter information, the current coding block into a plurality of subblocks;
    obtaining inter prediction parameter information for each subblock of the plurality of subblocks based on inter prediction parameter information of a neighbor block adjacent to the subblock among neighbor blocks of the current coding block; and
    obtaining a prediction value for the subblock based on the obtained inter prediction parameter information.

2. The method of claim 1, wherein when the current coding block is partitioned into 4 subblocks having a same size, inter prediction parameter information for a top left subblock of the 4 subblocks is obtained from a top left neighbor block adjacent to the current coding block, inter prediction parameter information for a top right subblock of the 4 subblocks is obtained from a top neighbor block adjacent to the current coding block, inter prediction parameter information for a bottom left subblock of the 4 subblocks is obtained from a left neighbor block adjacent to the current coding block, and inter prediction parameter information for a bottom right subblock of the 4 subblocks is obtained from a temporal neighbor block of the current coding block.

3. The method of claim 1, wherein when the current coding block is partitioned into 2 subblocks having a same size and each having a greater vertical size, inter prediction parameter information for a left subblock of the 2 subblocks is obtained from a left neighbor block adjacent to the current coding block, and inter prediction parameter information for a right subblock of the 2 subblocks is obtained from a top neighbor block adjacent to the current coding block.

4. The method of claim 1, wherein when the current coding block is partitioned into 2 subblocks having different sizes and each having a greater vertical size and a left subblock has a greater horizontal size than a right subblock, inter prediction parameter information for the left subblock of the 2 subblocks is obtained from a left neighbor block adjacent to the current coding block, and inter prediction parameter information for the right subblock of the 2 subblocks is obtained from a top right neighbor block adjacent to the current coding block.

5. The method of claim 1, wherein when the current coding block is partitioned into 2 subblocks having different sizes and each having a greater vertical size and a left subblock has a smaller horizontal size than a right subblock, inter prediction parameter information for the left subblock of the 2 subblocks is obtained from a bottom left neighbor block adjacent to the current coding block, and inter prediction parameter information for the right subblock of the 2 subblocks is obtained from a top neighbor block adjacent to the current coding block.

6. The method of claim 1, wherein obtaining the inter prediction parameter information for the subblock based on the inter prediction parameter information of the neighbor block adjacent to the subblock includes:
    assigning the inter prediction parameter information of the neighbor block adjacent to the subblock to the inter prediction parameter information for the subblock.

7. The method of claim 1, wherein obtaining the inter prediction parameter information for the subblock based on the inter prediction parameter information of the neighbor block adjacent to the subblock includes:
    assigning a representative value of the inter prediction parameter information of the neighbor block adjacent to the subblock to the inter prediction parameter information for the subblock.

8. The method of claim 7, wherein the representative value is one of an average value, a median value, a modal value, or a minimum value.

9. The method of claim 1, wherein obtaining the inter prediction parameter information for the subblock based on the inter prediction parameter information of the neighbor block adjacent to the subblock includes:
    when the neighbor block adjacent to the subblock is not available, assigning inter prediction parameter information of an available neighbor block among the neighbor blocks of the current block to the inter prediction parameter information for the subblock.

10. The method of claim 9, wherein the inter prediction parameter information of the available neighbor block is scaled in consideration of a POC (picture order count) distance ratio of reference pictures between the neighbor block adjacent to the subblock and the available neighbor block.

11. The method of claim 1, wherein the bitstream does not include information indicating a neighbor block from which the inter prediction parameter information for the subblock is to be obtained.

12. The method of claim 1, wherein the neighbor blocks of the current coding block include at least one spatial neighbor block adjacent to the current coding block in a picture including the current block and a temporal neighbor block in a picture different from the picture including the current block.

13. A decoding apparatus configured to decode a bitstream for a video signal, the decoding apparatus comprising a processor, wherein the processor is configured to:
    obtain first flag information for a current coding block from the bitstream, wherein the first flag information indicates whether the current coding block is coded in a skip mode;
    obtain, based on the first flag information indicating that the current coding block is coded in the skip mode, second flag information for the current coding block from the bitstream, wherein the second flag information indicates whether the current coding block has multiple inter parameter information based on subblocks of the current coding block;
    partition, based on the second flag information indicating that the current coding block has multiple inter parameter information, the current coding block into a plurality of subblocks;
    obtain inter prediction parameter information for each subblock of the plurality of subblocks based on inter prediction parameter information of a neighbor block adjacent to the subblock among neighbor blocks of the current coding block; and
    obtain a prediction value for the subblock based on the obtained inter prediction parameter information.

14. The decoding apparatus of claim 13, wherein when the current coding block is partitioned into 4 subblocks having a same size, inter prediction parameter information for a top left subblock of the 4 subblocks is obtained from a top left neighbor block adjacent to the current coding block, inter prediction parameter information for a top right subblock of the 4 subblocks is obtained from a top neighbor block adjacent to the current coding block, inter prediction parameter information for a bottom left subblock of the 4 subblocks is obtained from a left neighbor block adjacent to the current coding block, and inter prediction parameter information for a bottom right subblock of the 4 subblocks is obtained from a temporal neighbor block of the current coding block.

15. The decoding apparatus of claim 13, wherein when the current coding block is partitioned into 2 subblocks having a same size and each having a greater vertical size, inter prediction parameter information for a left subblock of the 2 subblocks is obtained from a left neighbor block adjacent to the current coding block, and inter prediction parameter information for a right subblock of the 2 subblocks is obtained from a top neighbor block adjacent to the current coding block.

16. The decoding apparatus of claim 13, wherein when the current coding block is partitioned into 2 subblocks having different sizes and each having a greater vertical size and a left subblock has a greater horizontal size than a right subblock, inter prediction parameter information for the left subblock of the 2 subblocks is obtained from a left neighbor block adjacent to the current coding block, and inter prediction parameter information for the right subblock of the 2 subblocks is obtained from a top right neighbor block adjacent to the current coding block.

17. The decoding apparatus of claim 13, wherein when the current coding block is partitioned into 2 subblocks having different sizes and each having a greater vertical size and a left subblock has a smaller horizontal size than a right subblock, inter prediction parameter information for the left subblock of the 2 subblocks is obtained from a bottom left neighbor block adjacent to the current coding block, and inter prediction parameter information for the right subblock of the 2 subblocks is obtained from a top neighbor block adjacent to the current coding block.

18. The decoding apparatus of claim 13, wherein obtaining the inter prediction parameter information for the subblock from the neighbor block adjacent to the subblock includes:
    assigning inter prediction parameter information of the neighbor block adjacent to the subblock to the inter prediction parameter information for the subblock.

19. The decoding apparatus of claim 13, wherein obtaining the inter prediction parameter information for the subblock from the neighbor block adjacent to the subblock includes:
    assigning a representative value of inter prediction parameter information of the neighbor block adjacent to the subblock to the inter prediction parameter information for the subblock.

20. The decoding apparatus of claim 19, wherein the representative value is one of an average value, a median value, a modal value, or a minimum value.

* * * * *